(12) United States Patent
Wegelin

(10) Patent No.: US 10,679,447 B2
(45) Date of Patent: *Jun. 9, 2020

(54) LOCKING SYSTEM FOR EXCHANGE OF ITEMS, SERVICES, AND/OR FACILITIES

(71) Applicant: Jackson William Wegelin, Stow, OH (US)

(72) Inventor: Jackson William Wegelin, Stow, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,856

(22) Filed: Jun. 10, 2019

(65) Prior Publication Data

US 2019/0295350 A1 Sep. 26, 2019

Related U.S. Application Data

(63) Continuation-in-part of application No. 15/956,012, filed on Apr. 18, 2018, now Pat. No. 10,339,750.

(60) Provisional application No. 62/486,577, filed on Apr. 18, 2017.

(51) Int. Cl.
*G07C 9/00* (2020.01)
*G06Q 20/14* (2012.01)

(52) U.S. Cl.
CPC ......... *G07C 9/00912* (2013.01); *G06Q 20/14* (2013.01); *G07C 9/00817* (2013.01)

(58) Field of Classification Search
None
See application file for complete search history.

(56) References Cited

U.S. PATENT DOCUMENTS

| 6,882,269 B2* | 4/2005 | Moreno | A47G 29/141 235/383 |
|---|---|---|---|
| 10,339,750 B1* | 7/2019 | Wegelin | G07F 17/12 |
| 2002/0063157 A1* | 5/2002 | Hara | G06Q 10/08 235/462.02 |
| 2006/0015435 A1* | 1/2006 | Nathanson | G06Q 20/401 705/37 |
| 2015/0112887 A1* | 4/2015 | Camp | G06Q 10/0836 705/339 |
| 2015/0186840 A1* | 7/2015 | Torres | A47B 81/00 705/339 |
| 2018/0247369 A1* | 8/2018 | Smith | G06Q 30/016 |

* cited by examiner

*Primary Examiner* — Kristy A Haupt
(74) *Attorney, Agent, or Firm* — Cooper Legal Group, LLC

(57) ABSTRACT

One or more techniques and/or systems are provided for facilitating the exchange of an item. For example, a containment component is configured to receive one or more items. A locking component is configured to selectively restrict or allow access to the item. A code generation component is configured to generate and provide an unlocking code to a requestor (e.g., based upon payment by the requestor that requests access to the item). A code entry component is configured to receive user input of a code. The code entry component either retains the locking component in a locked state if the code is not validated as the unlocking code or transitions the locking component into an unlocked state if the code is validated as the unlocking code.

20 Claims, 24 Drawing Sheets

FIG. 20

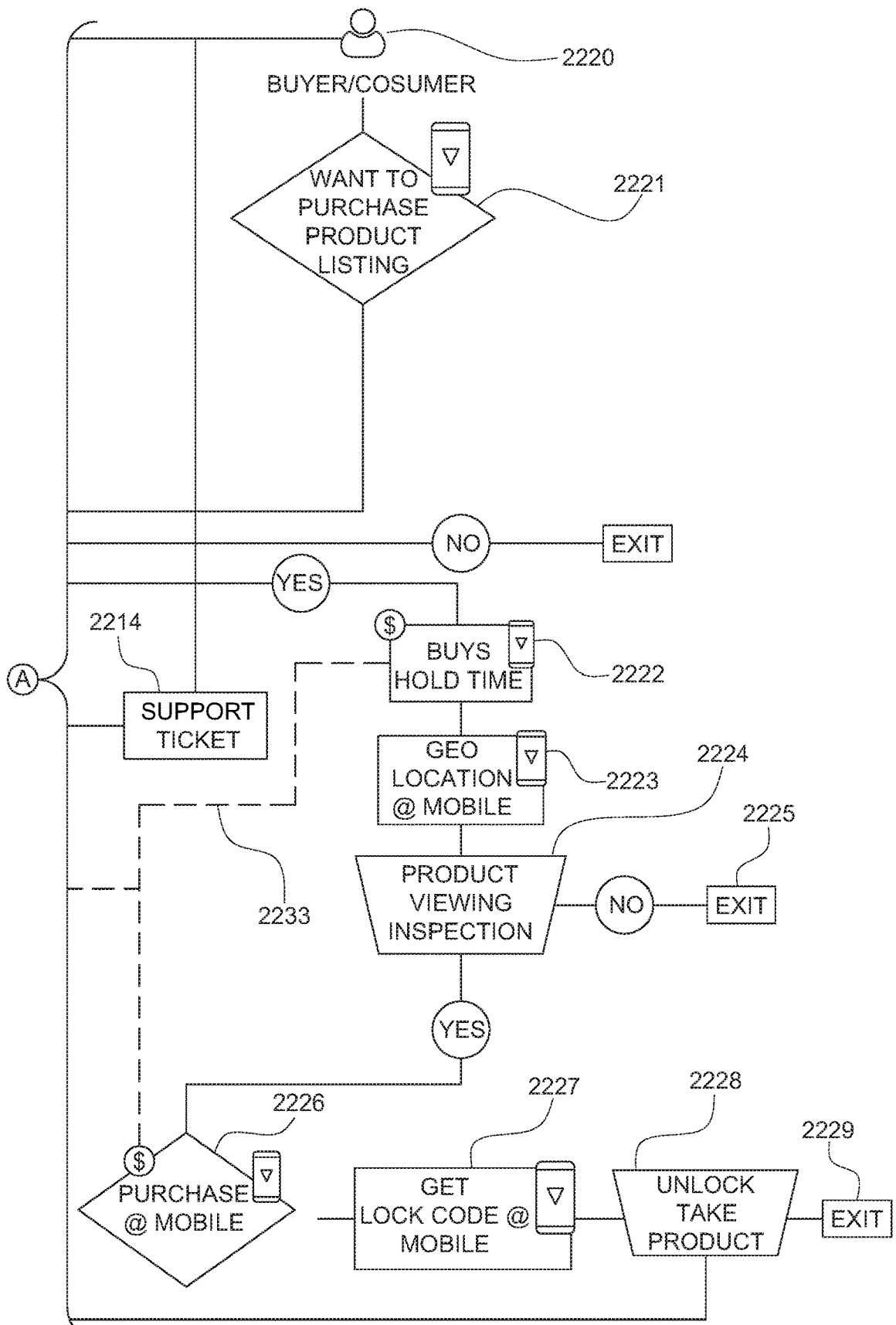
FIG. 22 (CONTINUOUS)

LOCKING SYSTEM FOR EXCHANGE OF ITEMS, SERVICES, AND/OR FACILITIES

CROSS-REFERENCE TO RELATED APPLICATIONS

This application is a continuation-in-part of, and claims priority to, U.S. patent application Ser. No. 15/956,012, filed on Apr. 18, 2018 and titled "LOCKING SYSTEM FOR EXCHANGE OF ITEMS, SERVICES, AND/OR FACILITIES," which claims priority to U.S. Provisional Patent Application No. 62/486,577, filed on Apr. 18, 2017, which are incorporated herein by reference.

BACKGROUND

Providers and consumers of new or used items, services, or facilities face many issues in a physical exchange between one another. Shipping via courier is expensive and often impractical for items of lower value and/or large size and there may not be suitable and secure means of exchange readily available. Access to facilities and rental of items can be even more difficult to arrange common exchange times and locations. Furthermore many consumers and businesses are looking for new ways to reduce costs, seeking more used items and reducing free amenities.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a request is received from a requestor for access to an item secured by a containment component by a locking component. An unlocking code is generated. The unlocking code is valid within a time range and is valid for either a single use or a plurality of uses. The unlocking code is provided to the requestor. User input of a code is received through a code entry component associated with the containment component. A locking component is modified into an unlocked state for providing the requestor with access to the item in response to the code being validated as corresponding to the unlocking code and being used within the time range.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 20 illustrates a lock service website.

DETAILED DESCRIPTION

Figure 1:
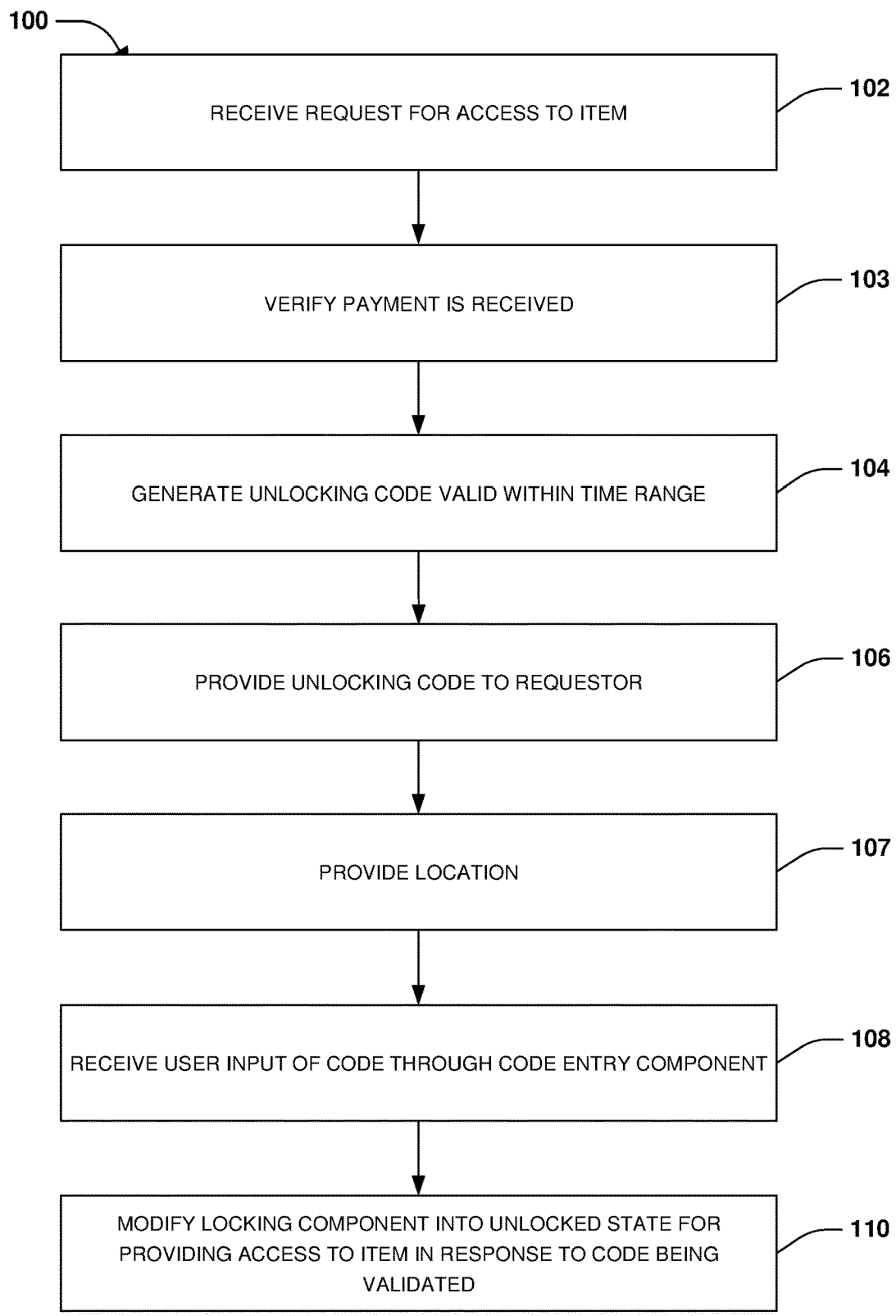
FIG. 1 is a flow diagram illustrating an exemplary method of facilitating exchange of an item.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

A locking and unlocking means is provided having a moveable restraint, a latch, and a prime mover. The restraint is configured to selectively restrict or permit access to an item (e.g., food, a bike, an object, etc.), service, or facility. The restraint is selectively opened and closed by the latch. Operation of the latch may be performed, enabled, or restricted by the motion of the prime mover. The prime mover is controlled by a code entry means, a code processing means, and a power source. The code entry means may be manual, such as a keypad, or wireless, such as RF, IR, Bluetooth, WiFi, ANT, Zigbee, Cellular, or other suitable means. The code entry means may also be used to receive information from the locking and unlocking means. A visible display, such as light emitting diodes, liquid crystal display, etc. is provided. The locking and unlocking means is identified by a serial number, which may consist of letters, numbers, symbols, or any combination thereof. A secondary identifier may be used to publicly identify the lock, as the serial number may be kept confidential. This secondary identifier may also consist of letters, numbers, symbols, or any combination thereof. The locking and unlocking means may be equipped with a real time clock and supporting hardware and software, including a temperature measurement means configured to adjust the operation of the real time clock for accurate operation in a variety of temperatures. The code entry means may additionally provide for the setting of the clock, configuring of the serial number, and other maintenance and configuration aspects of the locking and unlocking means. The moveable restraint may be conductive and complete an electrical circuit when closed, for the purpose of electronically verifying the closure of the electronic restraint. There may be an alternate means of attachment and an internal alarm.

The locking and unlocking means may be configured as a portable padlock or cable lock, an integrated cabinet lock, or a functional part of a piece of equipment. As a part of the functional piece of equipment, the lock may alternatively or additionally disable or enable the functional piece of equipment. The locking and unlocking means may be configured as part of a vending device, selectively enabling vending of products or services.

By having a locking and unlocking means as described, it allows multiple persons to interact in new and unique ways at multiple locations and capacities during an item exchange. A lock provider generally provides at least one locking and unlocking means. A location provider generally provides the location for at least part of the item exchange. An item provider provides at least one item involved in the exchange. A consumer accesses or uses at least one item used in the item exchange. Additionally, a transportation provider may transport an item. A single person or party may fulfill one or many capacities in the same item exchange. This provides a very flexible ecosystem for exchange of items. In addition, each capacity may have its own location. For example, the lock provider has a provider location, while the consumer has a consumer location. These locations may be public or private and commercial or non-commercial.

This flexible ecosystem allows for items to be exchanged freely without a fixed storage location. For example, a first consumer at a first consumer location may borrow a mobile object via operation of the prime mover at the provider location. The first consumer may then re-secure the mobile object at the first consumer location. In this way, the first consumer, although still potentially financially responsible for the mobile object, may offer the mobile object for use at the first consumer location, rather than returning to the provider location. A second consumer may then borrow the mobile object at the first consumer location. In many rental scenarios, such as bicycle rentals, there is often a lack of storage space in living quarters or an inconvenient return transportation, and thus it is advantageous to re-secure the mobile object at its point of last use, which may be a more likely point for re-rental or display.

In one embodiment, the system may include the locking and unlocking means and a remote computer with an application configured to generate codes specific to the lock provider's serial numbers, which are under his control. Codes may also be generated specific to certain time frames in conjunction with the serial numbers.

In another embodiment, the system may include the locking and unlocking means and remote computer that the lock provider does not control. With an application to generate codes specific to the lock providers serial numbers. In this embodiment, the lock provider would relinquish control and knowledge of the serial numbers and/or access to the application configured to generate said codes. This will allow the remote computer to generate codes and provide additional services. For example, the remote computer would prevent issuance of an unlocking code for a certain amount of time, thus creating a hold on the item secured in the locking and unlocking means. In addition, the remote computer may easily provide access to multiple parties, coordinate codes, and charge fees appropriate to each party.

The lock provider and/or location provider can set rules as to what can be sold, placement fee, commission, and pricing requirements. For example, at a store that sells new lawnmowers, a lock provider may only allow used lawnmowers selling at over $100, $1 placement fee, with a commission of 20% while a convenience store may allow lawnmowers with no minimum price and no commission, and provide a placement incentive to generate visitors to their store. This will allow the location or lock provider to control the mix of products and their desired customer base to achieve the maximum overall value based on the operations of the specific location.

The locking and unlocking means can interact with a website, adding convenience to a transaction. For example, the consumer may search and find a listing on a website before locating the item and the locking and unlocking means. Alternatively, a consumer may interact with the item and locking and unlocking means before seeking information about the item on the website. In either instance, the unlocking code can be provided via the website or an alternate remote computer.

Codes for the locking and unlocking means can be one time or multiple use. If a code is multiple use it may have a cancellation code that ends the validity of the multiple use code.

The locking and unlocking means may have one or more master codes which are always valid. However, the validity of the one or more master codes may have cancellation codes that end their validity.

The codes may be generated to be valid only during a fixed time frame at which they will become invalid.

It is often useful to know when an item has been secured or re-secure in the locking and unlocking means. A means of remotely generating a re-locking code related to said unlocking code is provided, which may be related to a specific serial number, time, and/or unlocking code. Said relocking code being provided by said locking and unlocking means after the defined duration of validity has ended. The relocking code may also be provided if no unlocking code is provided, such that the item can be secured in the locking and unlocking means when it is in an unlocked state. Said relocking code may be provided via a visible display or wireless communications. The restraint of the locking and unlocking means may be visible, such that one can visibly see that an item is secured. When said restraint and visible display are simultaneously perceivable via a single vantage point, a digital photograph may be taken with a mobile device which provides a confirmation that an item has been secured or re-secured. The digital photograph can be sent to another party and may be embedded with time, location, and personal identification information, which are contained in the mobile device. This methodology allows items to be secured or re-secured at any location, providing flexibility in locations. This can allow for items to be secured or re-secured in the most convenient locations, which may be a desirable location for any party involved in an item exchange. This may include re-securing the item at a point of display for sale or rent. This will save time and labor for parties, and reduce storage and transportation costs.

Access to a point of entry secured by the locking and unlocking means may often be bi-directional. For example, a door may be used to access a facility having an inside and an outside. The point of entry, often a door, is accessible from the inside and the outside. When relinquishing access to the facility at the end of a purchased time of access, the cancellation code and relocking code may be entered from the outside, preventing access from both the inside and the outside. The digital photograph showing the unlocking code and the point of entry will then provide confidence that no parties have chosen to remain on the inside of the facility after the end of the purchased time of access.

The locking and unlocking means may have services that are provided on a subscription. As such a deactivation code may be entered into the locking and unlocking means to deactivate its functionality. In addition, a visible deactivation confirmation code may be displayed in response to the entry of the deactivation code.

In some cases, it may be desirable to conceal the item after visual confirmation that the item has been secured. This may be particularly useful with items of great value or those subject to theft. Examples include but are not limited to cash payments, jewelry, precious metals, pharmaceuticals, and electronic devices. An enclosure for performing this function may include a main housing, a significantly transparent cover, a first latch having an open position and a closed position and configured to receive a locking and unlocking means to securely contain an item when in a closed position, a significantly opaque cover, a second latch configured to secure said significantly opaque cover in a closed position. The second latch is configured to be inaccessible when both the significantly transparent cover and the significantly opaque cover are simultaneously in their said closed positions. This enclosure may be a standalone device or may be integrated into the locking and unlocking means.

The locking and unlocking means has a first means of selectively attaching said locking and unlocking means via said prime mover, however, it may be desirable to selectively attach the locking and unlocking means via an alternate means of attachment, such that the locking and unlocking means is attached to the item or location even when the first means of selectively attaching said locking and unlocking means is unattached. Examples include attaching to a fixed feature at specific location or a specific item.

Payment or other compensation may be made by any suitable means. This may include, but is not limited to cash, trade, electronic payment, internet based payment, utility bill, reward points, credits, bitcoin, cryptocurrency, etc. Payment made separately from the item may preventing crime, thus it may be advantageous to receive physical payment in one locking and unlocking means at a first location and simultaneously receive an item in a second locking and unlocking means at a second location. By providing the unlocking and relocking codes that are dependent on substantially the same time, this can be achieved.

In some cases, the secured item with visual confirmation, may prompt a payment for purchase rental or loan. This creates a virtual pawn shop. The item is secured at the first location by a loan seeker with visual confirmation sent to a pawn broker. The pawn broker provides a loan. If loan is not repaid after a certain time, the item can be removed from the locking and unlocking means or listed for resale at the first location. If the loan is repaid, the unlocking code is provided to the loan seeker. This use case is not limited to loans, as it may be easily adapted for a purchase for resale transaction.

If this device is used to vend items it offers several unique advantages over coin operated vending. When used for vending, no secure credit card processing is used at the vending level and no currency is stored. Because there is substantially little value to stolen vended items vs currency or credit card access codes stored in the device, the device can be less secure and much lower cost than previous vending devices. This lends itself to construction without the use of expensive materials or components. Use of plastic enclosures vs. metal enclosures is one example. In addition, as no wireless connectivity is required for off-line operation, lower costs can be achieved vs wirelessly connected devices.

FIG. 1 illustrates a method 100 for facilitating exchange of an item. At 102, a request may be received from a requestor for access to an item (e.g., a lawn mower) secured within a containment component (e.g., a physical structure to which the lawn mower can be secured by a lock) by a locking component. At 103, payment by the requestor for accessing the item may be verified. At 104, an unlocking code is generated. The unlocking code is valid within a time range (e.g., a user may use the unlocking code within the next 3 hours to gain access to the lawn mower). The unlocking code may be valid for a single use or a plurality of uses. At 106, the unlocking code may be provided to a requestor (e.g., through a display of the containment component, text message, email, audible notification, etc.). In some embodiments, a containment component may comprise a locking structure, such as a mobile locking structure (e.g., a cable bicycle lock), such that the containment component is mobile as opposed to a fixed structure such as a box. In some embodiments, a containment component may comprise a locking structure, and the containment component is mobile and thus can move with an item. In some embodiments, a containment component may comprise a fixed structure. In some embodiments, the containment component may comprise a padlock, a cable lock, a locker, a compartment, a fixed structure such as a box, etc. At 107, a location of the item is provided to the requestor.

At 108, user input of a code may be received through a code entry component (e.g., the display, a keypad, a code scanner, a wireless transmission means, etc.) associated with the containment component. At 110, the locking component is modified into an unlocked state for providing the requestor with access to the item in response to the code being validated (e.g., by a code validation component) as corresponding to the unlocking code and being used within the time range. For example, the containment component and/or the locking component may comprise a code validation component that can validate codes based upon an unlocking code configured for the code validation component.

In an example, a temperature measurement may be obtained using a temperature sensor associated with the containment component. A clock, used to determine a current time for validating codes against time ranges, may be adjusted based upon the temperatures measurement.

In an example, a return request, to return the item to a return containment component (e.g., the containment component at an original location from which the item was retrieved; a different containment component located at a different location; the containment component currently located at a new position that is different than a position of the containment component when the user retrieved the item such as where the containment component is mobile), may be received. A relocking code may be generated as corresponding to the unlocking code. The relocking code may be provided to the requestor (e.g., displayed through a display associated with the return containment component). A second user input of a second code may be received such as through the code entry component. The locking component may be modified into a locked state for locking the item into the return containment component based upon the second code being validated as corresponding to the relocking code.

In an example, imagery from a device of the requestor may be received (e.g., a photo captured by a mobile device of the user). The imagery may be evaluated to validate whether the requestor has returned the item into a returned containment component in a locked state in an acceptable condition (e.g., human evaluation, image recognition evaluation, etc.). The imagery may be tagged with geolocation and time from a device such as the mobile device.

In an example, a translucent over is used to display the item within a visible state through the containment component to users. An opaque cover is utilized to hide the item (e.g., or payment such as money) within a hidden state through the containment component from users.

In an example, a determination may be made that a consignment agreement exists between a first entity and a second entity. The first entity may be offering the item and the second entity may own a location at which the containment component is located. Responsive to payment being submitted by the requestor for accessing the item, a first portion of the payment may be provided to the first entity and a second portion of the payment may be provided to the second entity.

In an example, an instruction to lock the containment component for restricting access to the item for a time duration may be received and implemented.

In an example, a delayed pickup request for the item at a delayed pickup time may be received. Responsive to the item not being retrieved from the containment component before expiration of the delayed pickup time, the requestor may be charged a penalty.

In an example, the containment component may be used as a dispenser for a plurality of items that are dispensed based upon valid code entry.

In an example, the code entry component may be configured as an add-on component for integration into a machine, such as a coin-op machine, such that validation of codes trigger operation of the coin-op machine.

In an example, a second user input of a second code may be received. The item (e.g., a product) may be deactivated in response to the second code being validated as corresponding to a deactivation code.

In an example, a third user input of a third code may be received. Access to a clock, the ability to delete or replace a master code, the ability to block an issued code, or the ability to change a serial number may be provided based upon the third code being validated as corresponding to a maintenance code.

In an example, the item may correspond to medication. Access may be restricted to the medication according to a planned interval of access and verification of proper consumption.

In an example, an alarm component may be provided to generate an alert based upon unauthorized attempts to access the item.

In an example, a fourth user input of a fourth code is received. Access to a sample of the item is provided in response to the fourth code being validated as corresponding to a sample access code.

In an example, a master code, having an indefinite validity timespan, is maintained.

In one embodiment of facilitating exchange of an item, a website is configured by an administrator for a product to be sold with a confidential serial number. A vendor is given access to modify portions of the product description, picture, price, etc. However, the serial number may be kept private and not shared with the vendor. The vendor can include a public location or a location that is to be kept private in which case a very genera location is given such as a city, zip code, visual radius on a map, etc. The vendor can determine if an unlocking code will be single or multiple use.

A buyer can view items online and request to inspect, purchase a hold/reservation, or purchase the item outright. The buy can select a duration of time to inspect, hold, or pickup, or a fixed time can be set by an administrator or vendor. A payment is made (e.g., for inspection or to hold the item then the payment is a deposit that could be refunded later). The payment is confirmed. A private location of the item is disclosed to the buyer.

When a purchase is made, a current time (UTC) is used by a server in conjunction with the serial number and duration to generate an encrypted unlocking code. The unlocked code is used to generate a visual relocking code. The visual relocking code may not be generated if the buyer is merely holding or inspecting the item. The unlocking code is sent to the buyer (not the seller or vendor). The visual relocking code is sent only to the vendor. A sold product will be listed as out of stock until relisted/edited by the vendor. A hold product will be shown with a hold time. New potential buyers can "get in line" and may be charged a fee for such.

When the unlocking code is entered, a current UTC time, serial number, and duration are used to validate the unlocking code. If validated, then a lock is unlocked to grant the buyer access to the item. If valid and unlocked and expired (single use is automatically expired, multiple use will expire at duration or enter a code to expire the code) the lock will calculate the visual relocking code and display it on the LEDs for 20 seconds after the lock is locked. It will turn on visual relocking code anytime a button is depressed and leave on for 10 seconds.

In some instances, when a product is on display online, etc., it may be advantageous for the end user to keep the exact location private. In this case, the public listing may only provide a general location, such as city, postal code, or vague depiction of the item location. Upon requesting a location, paying the requisite fee, or alternately placing a hold or purchasing the item, the exact location will be automatically or manually divulged. This reduces theft and increases safety.

After a lock is used by the general public, for example at a safe pickup location at a police station or business, a second seller will need to access the website to provide a code. The visual relocking code will be entered as the new password. For example, Red, Green, Off, etc. This will allow the code to be known at the physical location to anyone who seeks to use the lock. The website, having generated the relocking code for the last sale, will automatically change the password to the relocking code after the sale is completed.

Figure 2:
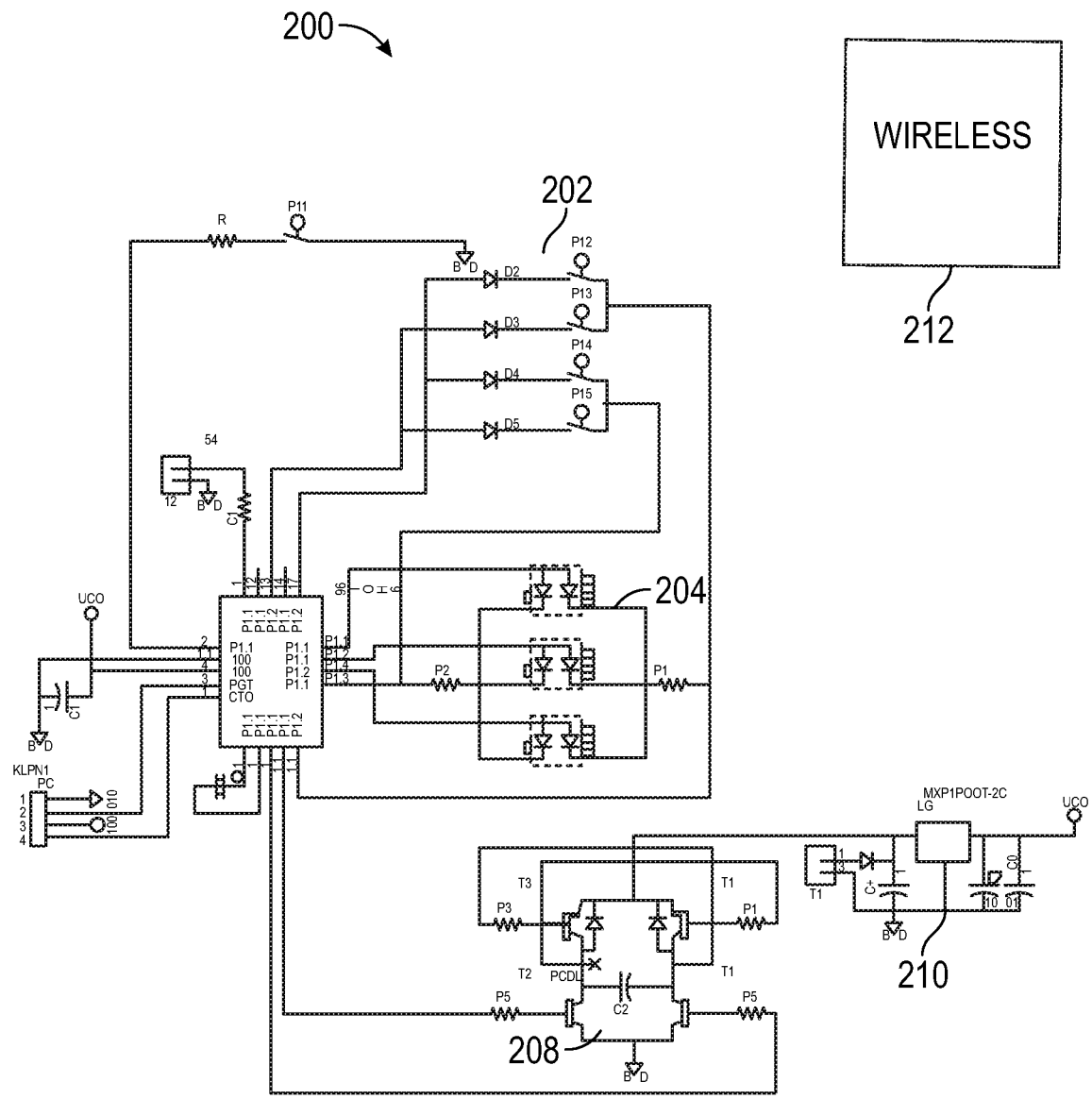
FIG. 2 is a component block diagram illustrating an exemplary system for facilitating exchange of an item.

FIG. 2 illustrates an example system 200 of circuitry used by an apparatus for facilitating exchange of an item. The system 200 may comprise a keypad 202 for receiving an unlocking or relocking code. The system 200 may comprise an indicator 204 (e.g., an LED, a light that blinks, or other status indicator). The system may comprise a power supply 210. The system 200 may comprise a motor controller 208 having forward and/or reverse drive for locking or unlocking a lock. The system 200 may comprise a microcontroller 206 for validating codes or performing other operation. The system may further comprise wireless connectivity 212, such as WiFi, Bluetooth, ANT, cellular, etc.

Figure 3:
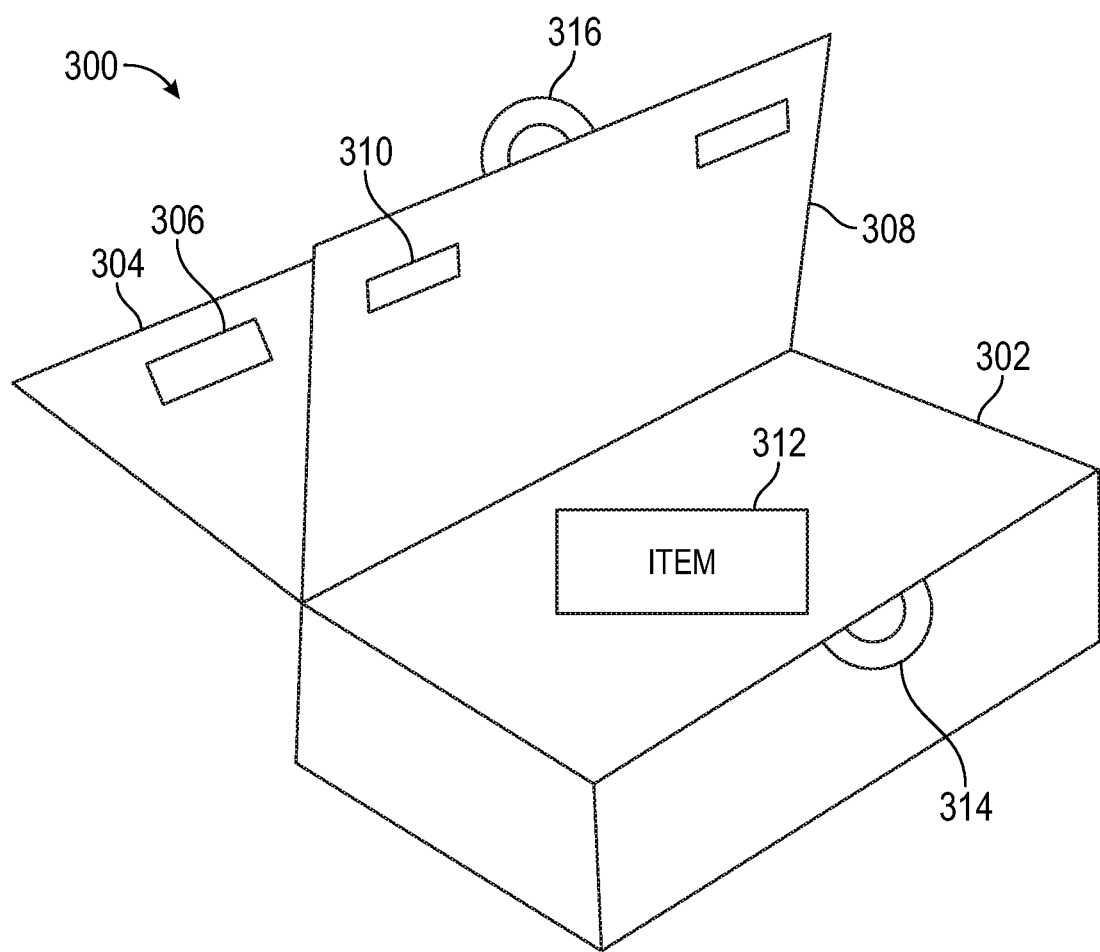
FIG. 3 is a component block diagram illustrating an exemplary system for facilitating exchange of an item.

FIG. 3 illustrates an example system 300 of an apparatus for facilitating exchange of an item 312. The apparatus comprises a house 302 within which an item 312 can be stored. A first cover 308 is at least partially translucent and may be configured to either be in a locked state or an unlocked state by a lock attached securing the house 302 to the first cover 308 at attachment points 316 and 314. A second cover 304 having an opaque portion may be configured to either be in the locked state by moving the second cover 304 into proximity of first cover 308 such that the latch protrusions 306 extend through the openings 310. The second cover 304 can then be moved to an unlocked state only when the first cover is in an unlocked state allowing access to the latch protrusions 306 that are extending through the openings 310.

Figure 4:
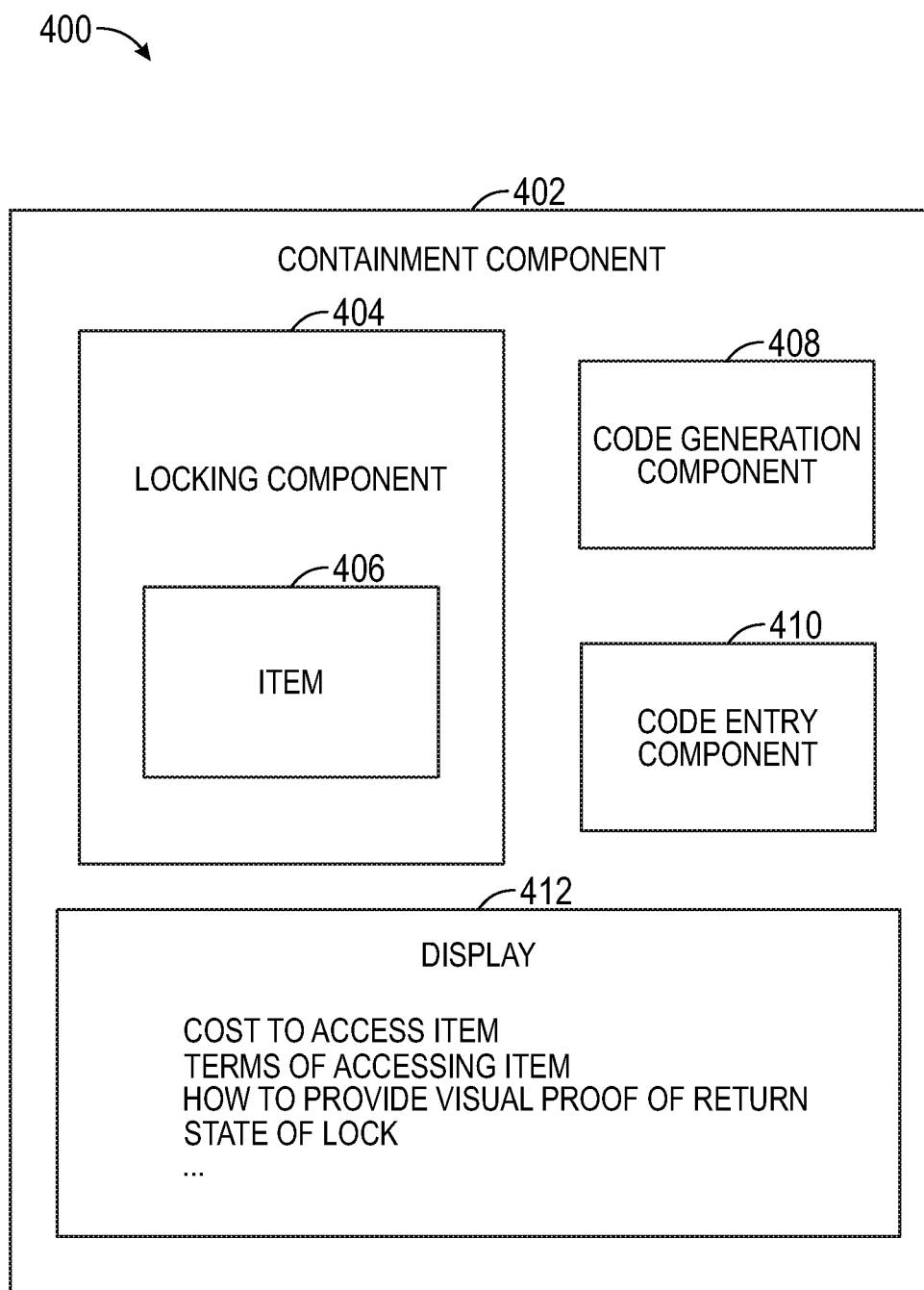
FIG. 4 is a component block diagram illustrating an exemplary system for facilitating exchange of an item.

FIG. 4 illustrates an example system 400 of an apparatus for facilitating exchange of an item 406. The apparatus comprises a containment component 402 configured to store the item 406 for selective retrieval. The apparatus comprises a locking component 404 configured to selectively lock or unlock the containment component 402 for restricting or providing access to the item 406. The apparatus comprises a code generation component 408 configured to receive a request, from a requestor, for access to the item 406 secured within the containment component 402 by the locking component 404. The code generation component 408 is configured to generate an unlocking code that is valid within a time range and is valid for either a single use or a plurality of uses. In an example, the unlocking codes and relocking codes are generated in the cloud or app, but the apparatus must receive them to decrypt them to determine validity. The relocking/confirmation type codes would be generated by the apparatus to be displayed on the display.

The apparatus comprises a code entry component 410 configured to receive a user input of a code. The code entry component 410 is configured to modify the locking component 404 into an unlocked state for providing access to the requestor to the item 406 in response to the code being validated as corresponding to the unlocking code and being used within the time range.

The apparatus comprises a display 412 through which various information may be provided, such as a cost to access the item 406, terms of accessing the item, how to provide visual proof of returning the item, a state of the locking component, the unlocking code, a re-locking code, a hold time for which the locking component 404 will not be unlocked, etc.

Figure 5A:
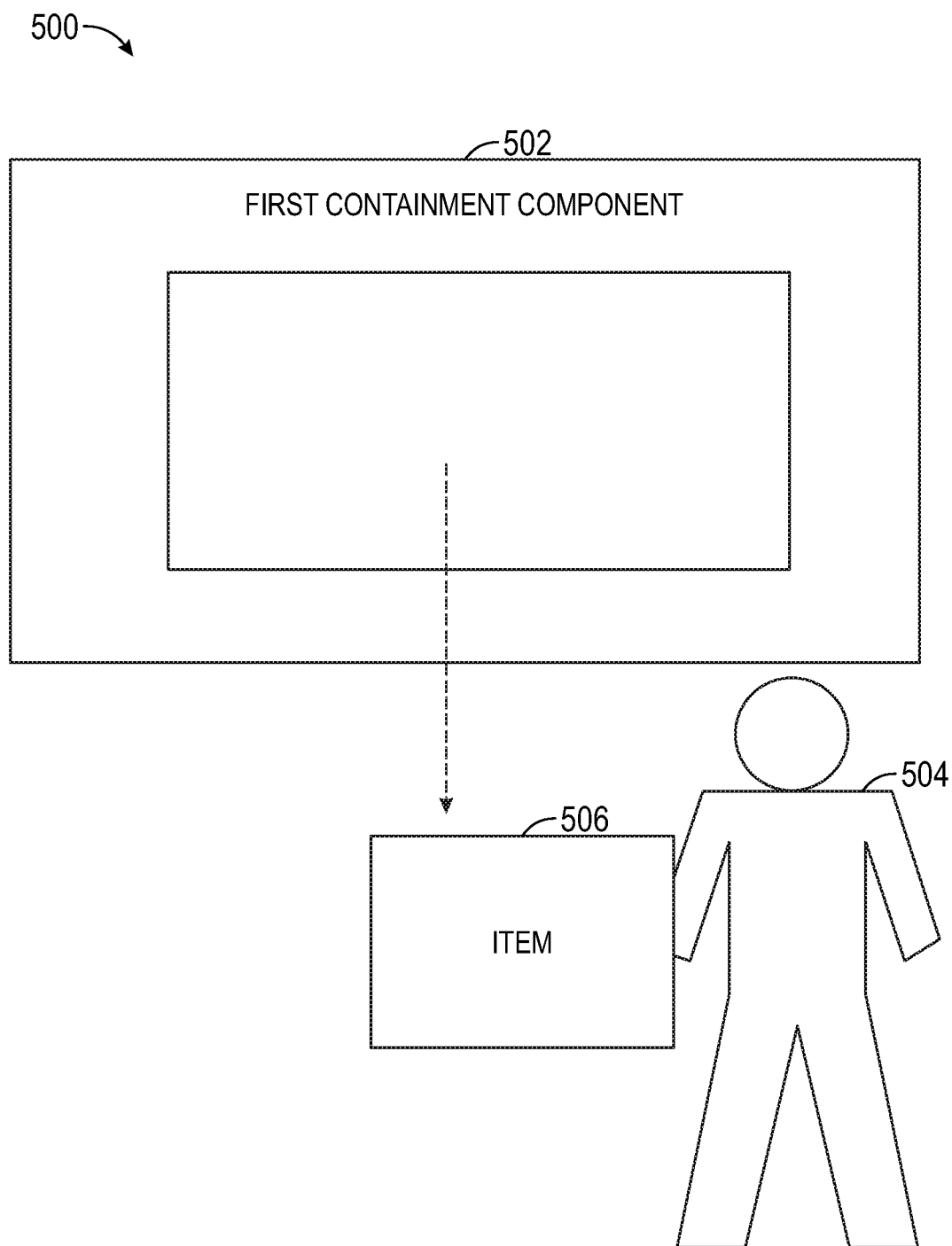
FIG. 5A is a component block diagram illustrating an exemplary system for facilitating exchange of an item, where a user retrieves an item from a first containment component.
Figure 5B:
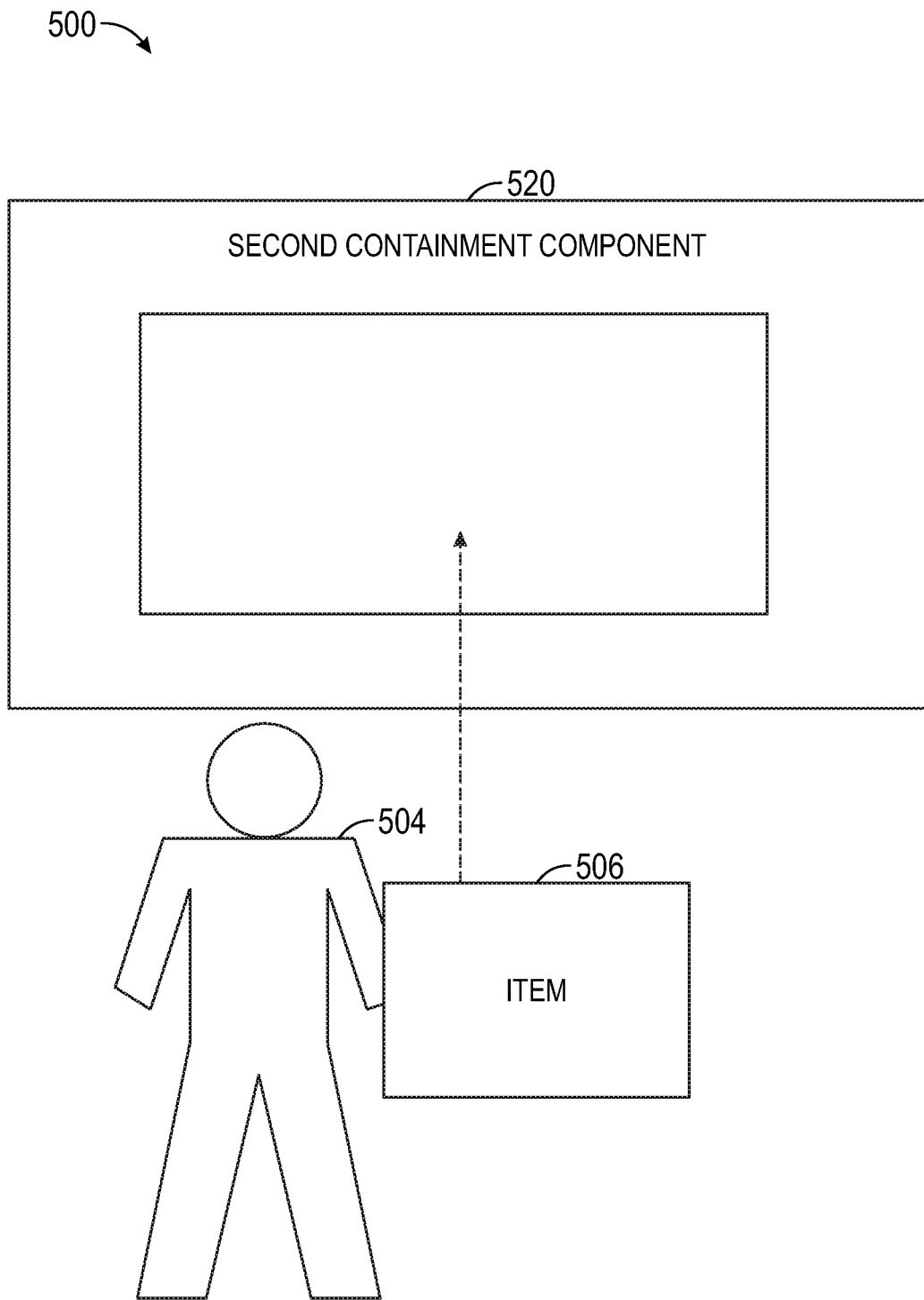
FIG. 5B is a component block diagram illustrating an exemplary system for facilitating exchange of an item, where a user returns an item to a first containment component.

FIGS. 5A and 5B illustrate examples of a system 500 of an apparatus for facilitating exchange of an item 506. For example, a user 504 may submit a code that is validated to provide the user 504 with access to retrieve the item 506 from a first containment component 502 at a first location (e.g., near a downtown coffee shop), as illustrated in FIG. 5A. The user 504 may travel with the item 506 to a second location (e.g., near a hotel) at which a second containment component 520 is located, as illustrated in FIG. 5B. Accordingly, the user 504 may use a re-locking code for returning the item 506 into the second containment component 520 in a locked state. The user 504 may capture a photo of the item 506 being locked in the locked state within the second containment component 520, which may be sent to a remote computing device for validating a proper return of the item 506. In this way, another user may retrieve the item 506 from the second containment component 520. In an example, the first containment component may travel with the item to a second location, and the first containment component is used to secure the item at the second location.

In one embodiment of facilitating the exchange of an item, a request, to obtain a loan secured by an item, may be received from a requestor of the loan. A locking code may be sent to the requestor for locking the item within a containment component. Imagery may be received from a device of the requestor, a mobile device, a camera, or from a camera associated with the containment component. The imagery may be evaluated to validate whether the requestor has secured the item into the containment component in a locked state in an acceptable condition. Responsive to validating the imagery, a transaction between the requestor and a loaner (e.g., a loan company) for the requestor to obtain the loan secured by the item may be facilitated. If a determination is made that the loan has not been repaid by the requestor according to a repayment term of the loan, the item may be offered for sale through the containment component.

In one example of an apparatus for facilitating exchange of an item, unlocking codes are time based and lock specific. A serial number is confidential to a user. Codes, such as unlock codes, are generated to work at a specific time. A code may be embedded with a start time, a validity duration, and/or a type (single/multiple use). A user can establish a unique name to publically identify a lock. A clock of the apparatus can be temperature compensated for keeping an accurate time.

In one example of an apparatus for facilitating exchange of an item, unlock codes are generated by the apparatus, which is easy to maintain, needs little to no setup, works even though there may be no wireless service, and there are not transmission between the apparatus and another component that can be captured.

In one example of an apparatus for facilitating exchange of an item, codes can be requested and sent using any type of technology, and thus the apparatus may be relatively future proof.

In one example of an apparatus for facilitating exchange of an item, photo confirmation of return of the item may be facilitated. For example, the apparatus may comprise a display (e.g., an LED display) showing a state of the lock (e.g., a return code). A camera/smart device can simultaneously show a condition of the item, the lock securing the item, etc. Location, time, and user information may be embedded into imagery from the device that is then verified such as by a human or by image recognition functionality.

In one example of an apparatus for facilitating exchange of an item, photo confirmation of a secured physical payment, and subsequent concealment of the payment is facilitated by the apparatus.

In one example of an apparatus for facilitating exchange of an item, the apparatus provides for the ability to enclose and lock money or other items under a translucent cover and then cover such with a second opaque cover that cannot be opened until the translucent cover is unlocked/opened.

In one example of an apparatus for facilitating exchange of an item, the ability to pawn and/or resell the item is provided. For example, the item is secured within the apparatus, a photo confirmation is sent, and payment is received such as to acquire a loan secured by the item. If the loan is not repaid within a certain amount of time, then the item can be offered for sale through the apparatus. In an example, the item can be at a display location the entire time of the loan period.

In one example of an apparatus for facilitating exchange of an item, the apparatus may be used to facilitate consignment of the item. For example, the apparatus is used to display the item at a location. If the item is sold, then the location gets a cut. If the item is not sold, then the apparatus can be removed. In an example, a time of the item being on display can be used to calculate a charge amount to the entity offering the item for sale. This leads to the addition of consignment at locations that historically sell only new items. The location controls pricing, types of products, fees, commission, duration of display, etc. (e.g., buying a used lawnmower at a hardware store).

In one example of an apparatus for facilitating exchange of an item, the apparatus can be used for providing holds on items. The seller/lock owner relinquishes control of unlocking codes, such that a third party can prevent the seller or another buyer from accessing the item for a certain amount of time. Holds can be paid for based on the time of the hold. Potential buyers do not have to worry about an item being sold out from under them before they can inspect it or pick it up.

In one example of an apparatus for facilitating exchange of an item, the apparatus can provide for late pick-up, such as buy now and pick up at a later date. If the item is not picked up by a certain time, the charge penalties can be applied.

In one example of an apparatus for facilitating exchange of an item, third party delivery can be provided. Third parties can be engaged to pick up an item from a lock and deliver it to a buyer, potentially locking it up for the buyer at an alternate location. A user could order a taxi, Uber, Lyft, etc. and issue the code to the driver and get the item delivered.

In one example of an apparatus for facilitating exchange of an item, the apparatus advantageous provides a means for exchanging items that are otherwise too large to profitably ship. For example, a used bicycle, lawnmower, or firewood cannot be shipped profitably, but displaying for pickup can now be practical.

In one example of an apparatus for facilitating exchange of an item, the apparatus can be used for providing vending of items. For example, an unlocking code can be used to dispense/deliver a product. This can be advantageous for situations where there is no coin/cash system because it does not require connectivity or a payment system. Thus, there are no funds or payment gateway to protect, just the products in the vending machine, which are often very low value (e.g., a gumball machine or sanitary napkin machine).

In one example of an apparatus for facilitating exchange of an item, the apparatus can be used for retrofitting a machine, such as a coin-op. For example, a module could replace a coin slot and knob (turn crank/pull). A code could be entered instead of the coin, the use of a manual (turn crank/pull), or automatic enabled machine. For example, this could be used for video games, gumball machines, vending machines, etc.

In one example of an apparatus for facilitating exchange of an item, the apparatus is used to increase foot traffic and/or advertising. When an item is picked up, it creates a unique destination. That destination is controlled by the seller, so it can benefit from whatever business that wants to add foot traffic, such as a convenience store/drug store. Sellers and buyers can select locations on a map to pick up or display items (e.g., an interactive map interface may be displayed through a computing device, such as where a user can place a pin to mark a pickup or return location; the interactive map interface may be populated with locations of available apparatuses and items; etc.).

In one example of an apparatus for facilitating exchange of an item, the apparatus can utilize a network or a cloud for payment and generation supply of codes. For example, a database is created in seller's account with lock, cost, and receivable account information. A payment is sent from a seller electronically, the payment is confirmed automatically, a code is generated, and the code is sent to the buyer that then enters the code in the lock. This could be done by text. A user sends a text with lock information, a payment request link is returned, and the seller then clicks link to pay. After payment is confirmed, the code is generated and texted to the buyer, who enters it into the lock. In an example, fees can be charged for transaction, which may be a subscription/service plan.

In one example of an apparatus for facilitating exchange of an item, items can be returned anywhere. For example, if a lock is attached to a rented item, then the rented item can be re-secured to any fixed object, across town, even at renter's location. Thus, the rented item can be picked up by the owner or re-rented at the return location. If re-rented at the return location, the first renter would still be responsible until the rented item is re-rented to the second renter. This creates rental businesses without the requirement for storage, re-inspection, etc.

In one example of an apparatus for facilitating exchange of an item, a real time map could display available items for rent.

In one example of an apparatus for facilitating exchange of an item, deactivation of a product can be provided as a service. For example, a deactivation code can be generated to be entered into a lock to decommission the produce. A visible confirmation code can be displayed.

In one example of an apparatus for facilitating exchange of an item, maintenance functions may be provided for the apparatus. For example, code entry can set the real time clock, delete master codes, cancel/block issued codes, change a serial number, etc.

In one example of an apparatus for facilitating exchange of an item, connectivity is provided for the apparatus, such as global position system (GPS), cellular, wifi, etc.

In one example of an apparatus for facilitating exchange of an item, the apparatus can be used to convert expense items to profit centers. For example, low cost vending items can replace complimentary items. In a restroom, a low cost vendor could provide toilet seat covers. At a restaurant, extra napkins could be charged for.

In one example of an apparatus for facilitating exchange of an item, the apparatus provides for little to no haggle. For example, if the buyer and seller are remote, then there could be no means to negotiate the price.

In one example of an apparatus for facilitating exchange of an item, the apparatus provides for sampling and market research. For example, samples may be given on site in exchange for a survey. Contact information may be taken, a code can be given, and a survey can be provided as a follow-up. This can replace a live person, manual collection, and/or shipping/handling.

In one example of an apparatus for facilitating exchange of an item, the apparatus can be used to sell extra items, such as through front of house vending. For example, a mustard company may want to put mustard product in a restaurant location that prefers not to stock the mustard product in a condiment bar. Thus, a customer can pay extra for access to the mustard product. The mustard company can restock the mustard product. A portion of the charge could be provided to the restaurant.

In one example of an apparatus for facilitating exchange of an item, the apparatus can be employed for medication management, such as home medication management. For example, time based codes only allow access at planned intervals, only if the medication is properly taken, and a user provides valid verification codes. In this way, the apparatus can act similar to a mini pill dispenser. This could prevent overdose, can confirm compliance for insurance/employer purposes (insurance could refuse to pay if the user does not follow a required regimen), etc.

In one example of an apparatus for facilitating exchange of an item, a master unlocking code is generated that does not expire. The master unlocking code may be kept secret. In an example, the master unlocking code may be sold for a sell.

In one example of an apparatus for facilitating exchange of an item, an alarm may be provided for the apparatus. The alarm can sound due to improper opening (detected by sensor) or from improper motion, too many wrong codes, etc.

In one example of an apparatus for facilitating exchange of an item, a lock can have an identifier other than a name. In an example, a bar or QR code, RFID tag/nfc, Bluetooth beacon, phone number/shorcode, web address etc. can be used to facilitate transactions.

In one embodiment, a locking system comprises a locking and unlocking means comprising a code entry means, a code processing means, a power source, and a prime mover configured to move between a locked and unlocked state. The locking system comprises a means of remotely generating an unlocking code unique to said locking and unlocking means that has a predefined duration of validity. The locking system comprises a means of remotely generating a re-locking code related to the unlocking code. The relocking code may be provided by the locking and unlocking means after the predefined duration of validity has ended.

In one embodiment, the relocking code is provided via a visible display.

In one embodiment, the relocking code is provided via wireless communications.

In one embodiment, the relocking code is provided only after said locking and unlocking means has been unlocked using the unlocking code and relocked.

In one embodiment, the locking system comprises a visible retention means. The visible retention means and the visible display are simultaneously perceivable via a single vantage point, such as by a user.

In one embodiment, the predefined duration of validity is determined by at least one of a number of uses, a fixed time duration, and/or a fixed time interval.

In one embodiment, the predefined duration of validity is determined by a cancellation request.

In one embodiment, an apparatus comprises an enclosure. The enclosure comprises a main housing, a significantly transparent cover, a first latch having an open position and a closed position. The first latch is configured to receive a locking and unlocking means to securely contain an item when in a closed position. The enclosure comprises a significantly opaque cover, a second latch configured to secure the significantly opaque cover in a closed position. The second latch is configured to be inaccessible when both the significantly transparent cover and the significantly opaque cover are simultaneously in closed positions.

In one embodiment, a locking system comprises a locking and unlocking means comprising a code entry means, a code processing means, a power source, and a prime mover configured to move between a locked and unlocked state.

In one embodiment, the locking system comprises a first means of selectively attaching the locking and unlocking means via the prime mover.

In one embodiment, the locking system comprises a second means of selectively attaching the locking and unlocking means via an alternate means of attachment.

In one embodiment, a lock is provided without a lock user (e.g., a person selling, renting, or otherwise offering the item) being able to unlock the lock.

In one embodiment, a master code is provided that does not expire. A sale of the master code may be facilitated between a first entity and a second entity.

In one embodiment, a sale of a service plan for accessing the item may be facilitated.

In one embodiment, deactivation of the item may be provided with confirmation.

In one embodiment, the first means of selectively attaching the locking and unlocking means is attached to a considerably fixed object and the second means of selectively attaching the locking and unlocking means is attached to a considerably mobile object.

In one embodiment, the second means of selectively attaching the locking and unlocking means is attached to a considerably fixed object and the first means of selectively attaching said locking and unlocking means is attached to a considerably mobile object.

In one embodiment, the considerably mobile object is a mechanism for performing a useful function.

In one embodiment, the locking system is configured to interface with a provider at a provider location, a first consumer at a first consumer location, and/or a second consumer at a second consumer location. The first consumer may be borrowing a mobile object via a first operation of the prime mover at the provider location. Subsequently, the second consumer may be borrowing the mobile object via a second operation of the prime mover at the first consumer location. In one example, there may be a plurality of consumers with which the locking system interfaces with, such as a third consumer.

Figure 6:
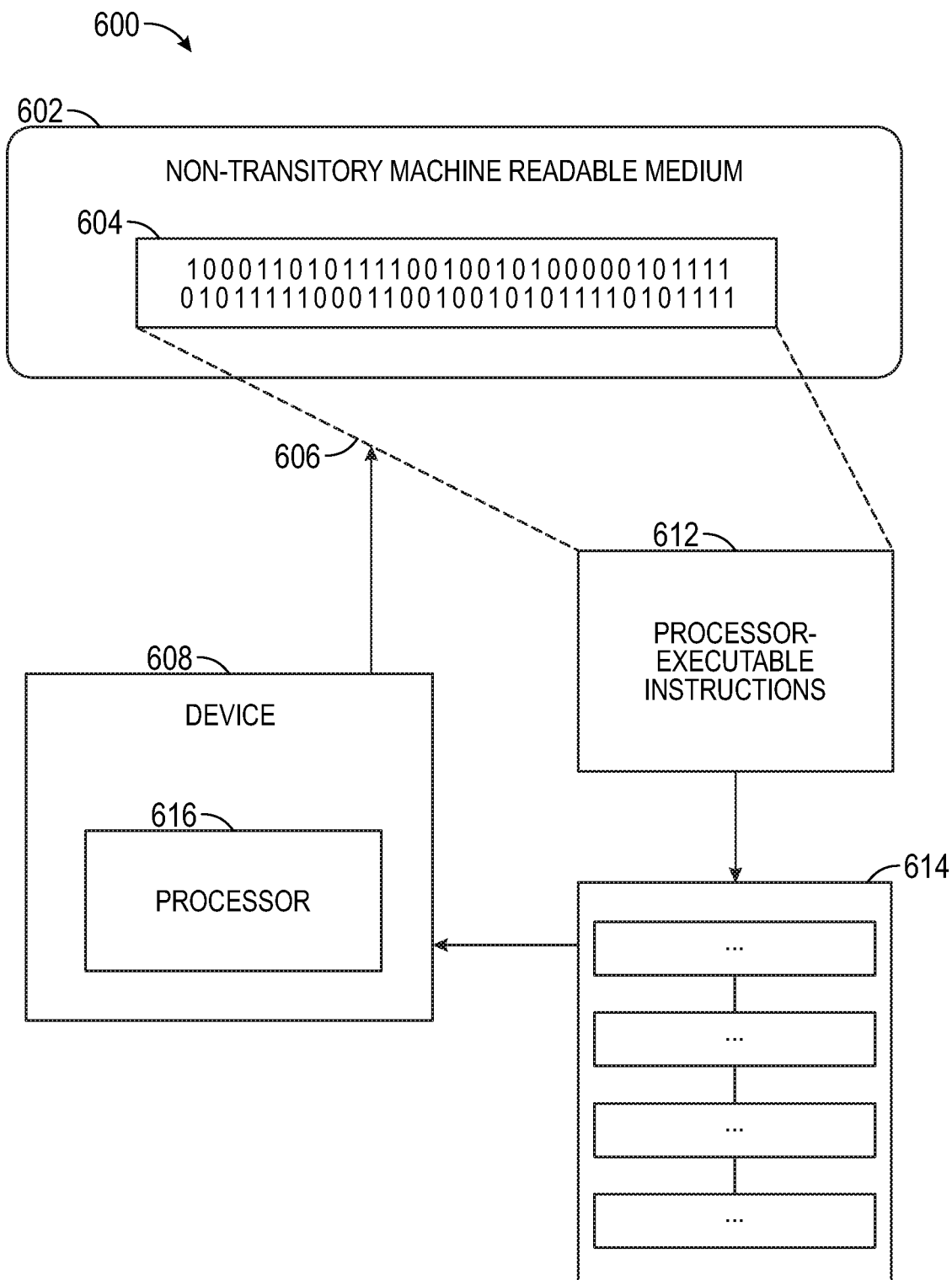
FIG. 6 is an illustration of an exemplary computing device-readable medium wherein processor-executable instructions configured to embody one or more of the provisions set forth herein may be comprised.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a device 608

(e.g., a read head of a hard disk drive, or a read operation invoked on a solid-state storage device), express the processor-executable instructions 612. In some embodiments, the processor-executable instructions 612, when executed cause performance of operations, such as at least some of the example method 100 of FIG. 1, for example. In some embodiments, the processor-executable instructions 612 are configured to cause implementation of a system, such as at least some of the example system 400 of FIG. 4, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
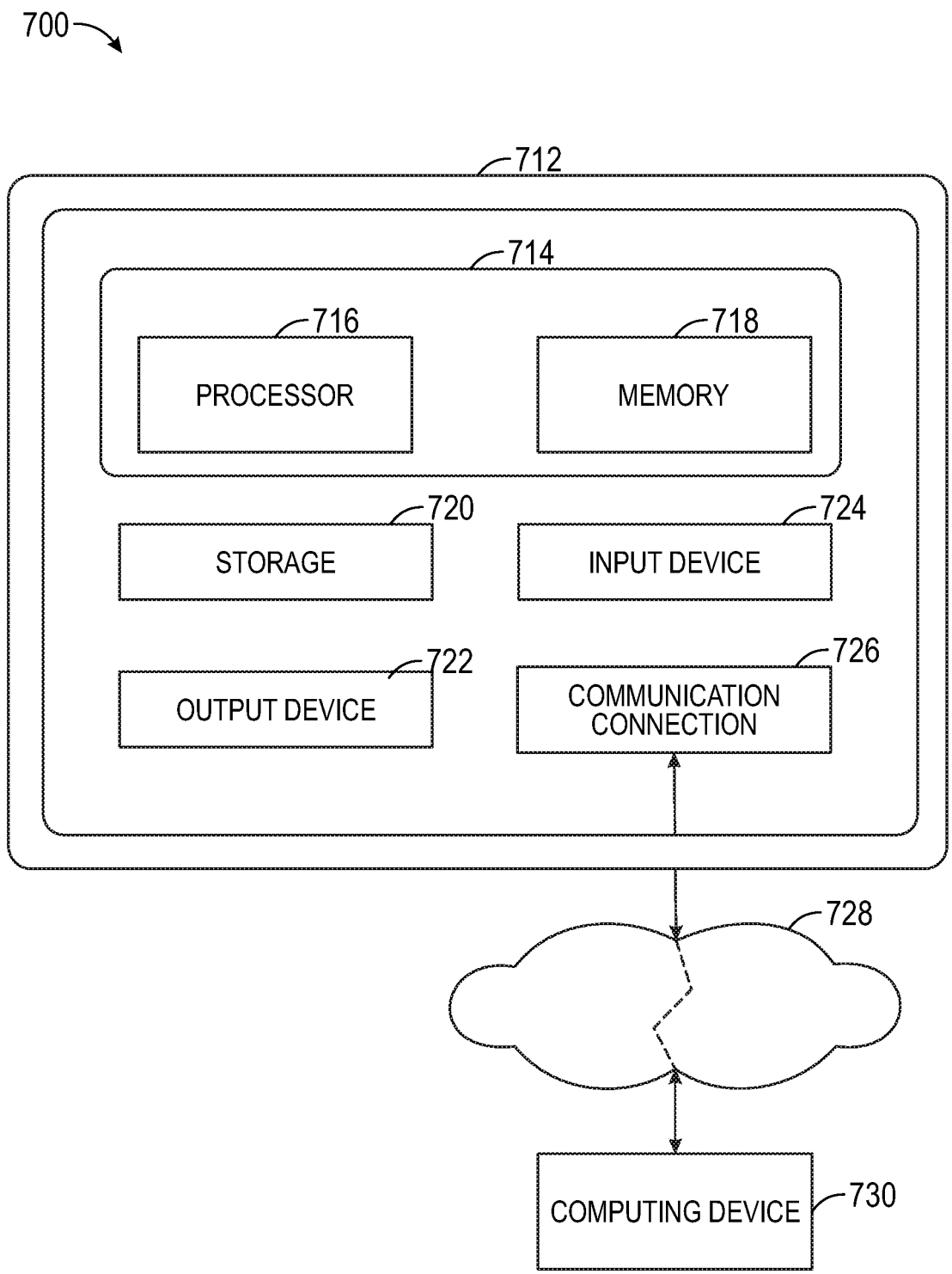
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 712 configured to implement one or more embodiments provided herein. In one configuration, computing device 712 includes at least one processor 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processor 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Computer storage media does not, however, include propagated signals. Rather, computer storage media excludes propagated signals. Any such computer storage media may be part of device 712.

Device 712 may also include communication connection 726 that allows device 712 to communicate with other devices. Communication connection 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection 726 may include a wired connection or a wireless connection. Communication connection 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device 724 such as keyboard, mouse, pen, voice input device, touch input device, infrared cameras, video input devices, and/or any other input device. Output device 722 such as one or more displays, speakers, printers, and/or any other output device may also be included in device 712. Input device 724 and output device 722 may be connected to device 712 via a wired connection, wireless connection, or any combination thereof. In one embodiment, an input device or an output device from another computing device may be used as input device 724 or output device 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Figure 8A:
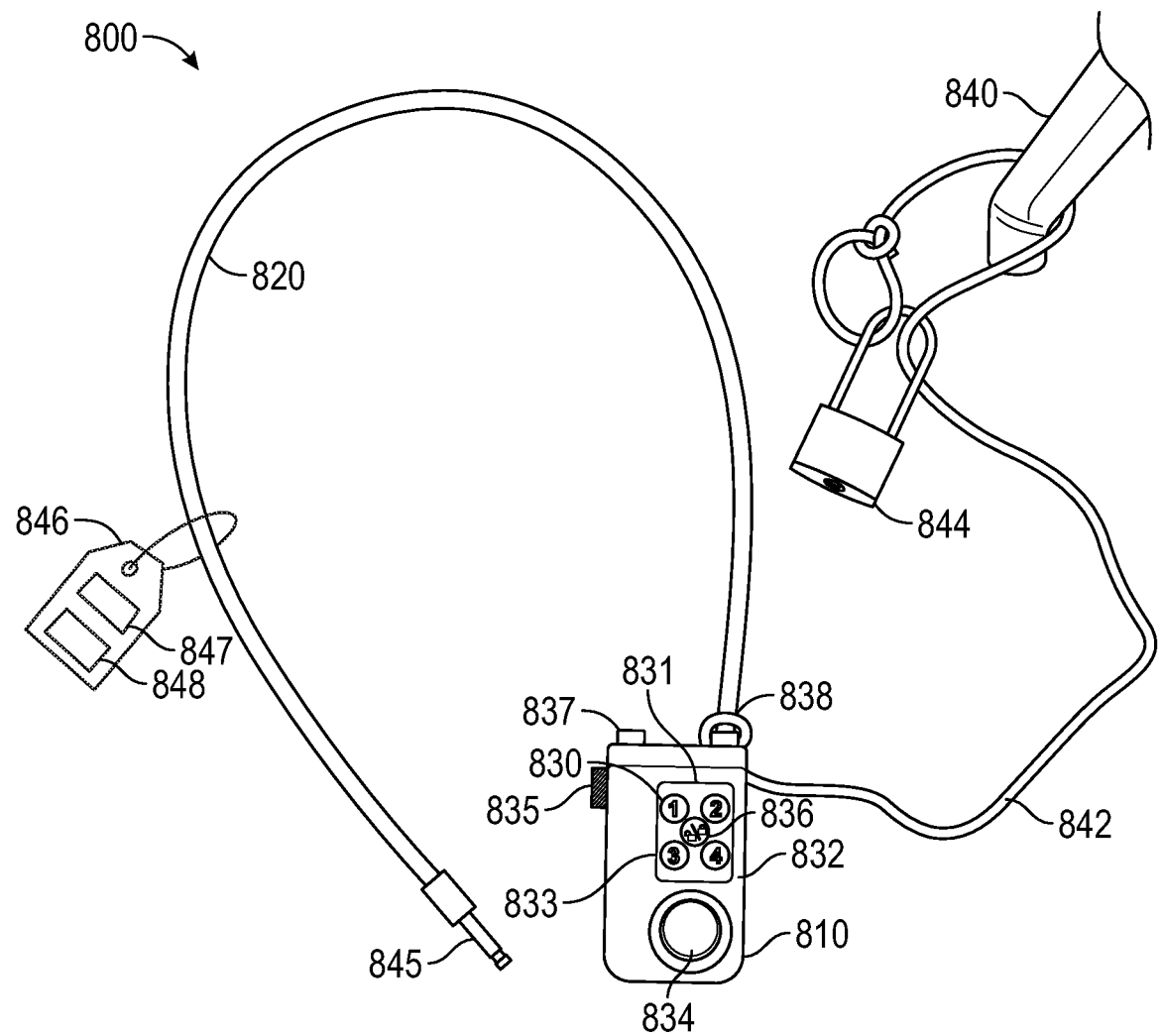
FIG. 8A illustrates a locking configuration.
Figure 8B:
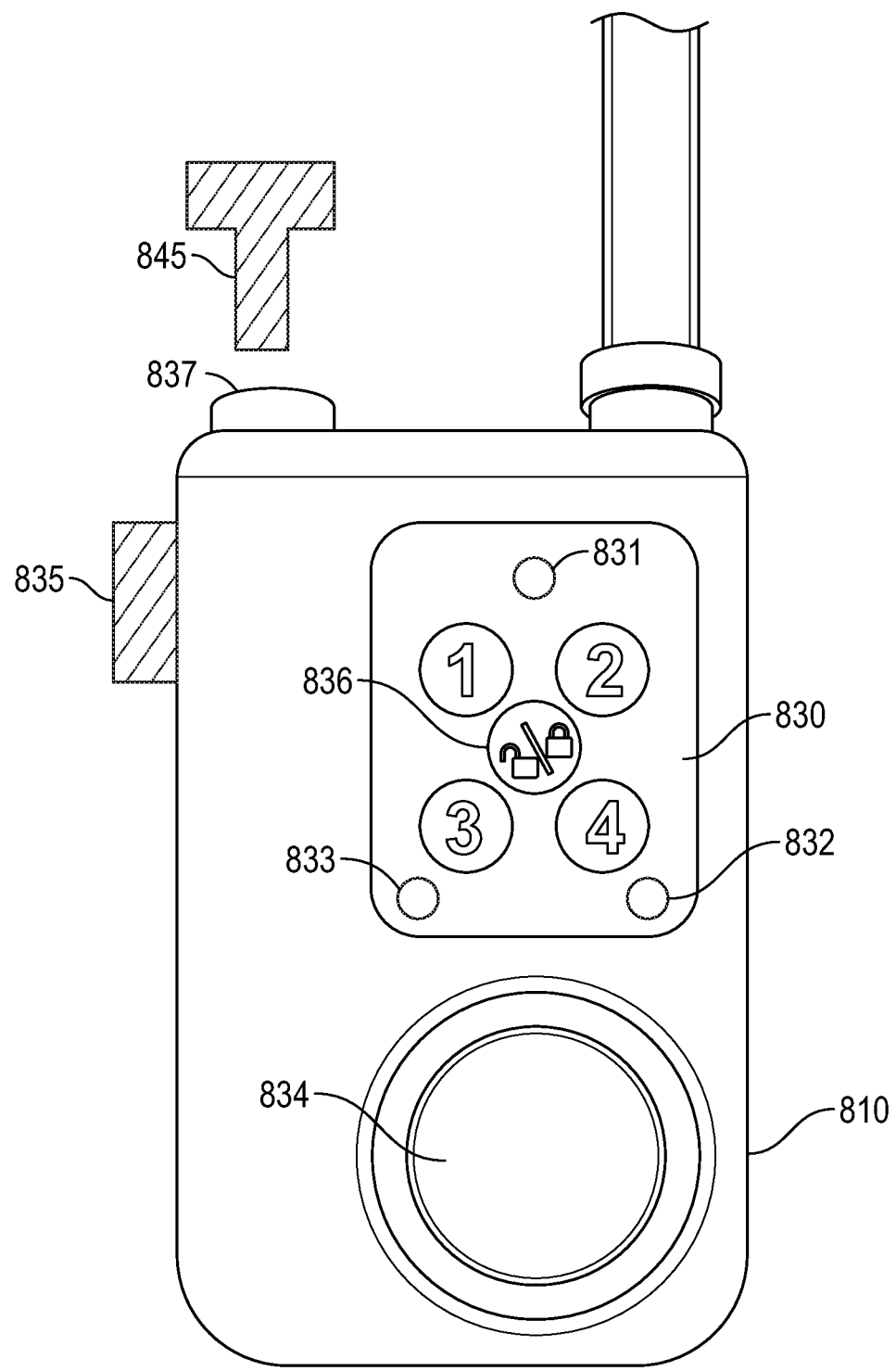
FIG. 8B illustrates a locking configuration.

FIGS. 8A and 8B generally depicts a locking configuration 800. The locking configuration 800 may include a lock assembly 810, a primary means of attachment 820 which may be a flexible cable as shown or a rigid member. The lock assembly 810 may optionally be secured to a fixed attachment point 840 via a secondary means of attachment 842 such that the lock assembly 810 remains secured to the fixed attachment point 840 when the primary means of attachment 820 is unlocked by entering an unlocking code into keypad 830. An attachment point can be any fixed (e.g., the fixed attachment point 840) or mobile item that will restrict, impede, indicate, or monitor the motion of the lock assembly 810. The primary means of attachment 820 can be used to selectively secure a mobile item, such as a bicycle or tool, to a location while the secondary means of attachment 842 selectively secures the lock assembly 810 to the mobile item, or vice versa. A secondary lock assembly 844 of the secondary means of attachment 842 allows the lock assembly 810 to be selectively removed from attachment point 840 if it is desired to change the location of transfer. It should be noted that the primary means of attachment 820 and the secondary means of attachment 842 are operated separately via lock assembly 810 and the secondary lock assembly 844 of the secondary means of attachment 842. This allows users to selectively control access via the primary means of attachment 820 and the secondary means of attachment 842.

Figure 23:
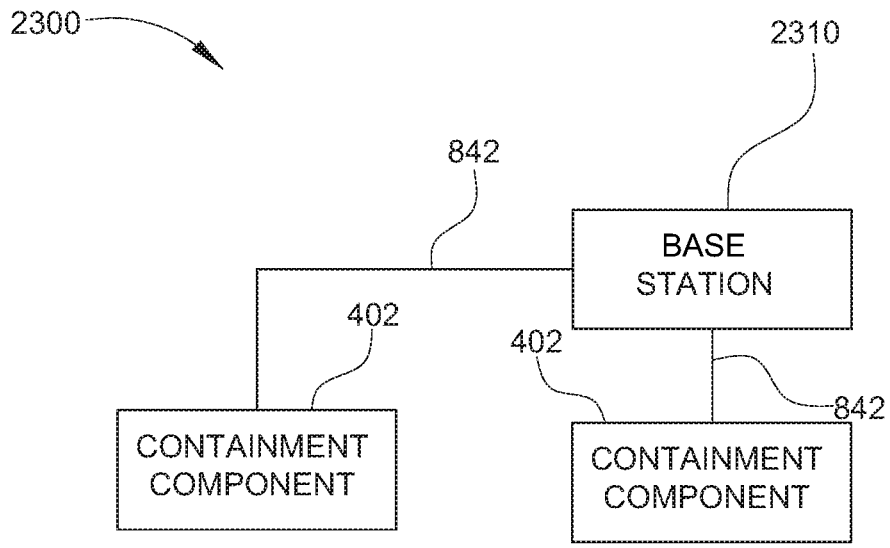
FIG. 23 illustrates a base station and containment components.

Secondary means of attachment 842 may be achieved wirelessly via IR, Bluetooth, RF, WIFI, magnetic detection, proximity sensor, etc. such that an indication occurs when the lock assembly is out of proximity of the fixed attachment point. The indication could be audible, visible, email, SMS, web based, etc. The indication may initiate other actions such as activating a camera, alerting police, etc. FIG. 23 illustrates an alternate locking configuration generally shown as 2300 employing a base station 2310 providing secondary means of attachment 842 to multiple containment components 402. In the alternate locking configuration 2300 it should be appreciated that the functions of the containment components 402 may be shared with the base station 2310. For example, the base station may have code entry 410 and display 412, while managing several containment components 402 that have only locking components 404 via a secondary means of attachment 842.

Keypad 830 may include indicators 831, 832, 833. These may be light emitting diodes of multiple colors such as red, green, blue, yellow, etc. The combination of the colors of indicators 831, 832, 833 may indicate a specific state of the lock assembly 810. Alternately, a display 412, show in FIG. 4 capable of using symbols, pictures, or alphanumeric characters could be employed for indication as well as instructions. One use of this may be to indicate that a specific unlocking code has been used and the lock assembly 810 has been relocked. The visible nature of indicators 831, 832, 833 allow for a picture depicting an item in its locked state, verifying that it has been returned. This can initiate the release of a deposit or the posting of an item, location, or service as available for sale or rent.

The primary means of attachment 820 is fixed to the lock assembly 810 at a fixed end 838 and at a removable end 845 that may be selectively inserted into opening 837 where is it retained by a latch 835. The primary means of attachment 820 and removable end 845 may be electrically conductive so as to complete a circuit inside the lock assembly 810 to verify the status of the primary means of attachment 820.

A sound emitter 834 may be included as an indicator of button press, locking, unlocking, tampering, motion, theft or other status of lock assembly 810.

Unique identifier 847 may be configured to communicate with a mobile device such that the information is transferred wirelessly via QR code, NFC, Bluetooth, etc.

A label 846 is included to provide information on operation and steps to access the primary means of attachment 820. The label 846 includes a unique identifier 847 which provides specific information uniquely identifying the lock assembly 810 and its present contents such as a serial number, phone number, or hyperlink. The unique identifier 847 may be static, dynamic or a hybrid of both. A static identifier may be a fixed identifying a name or mark, whereas a dynamic identifier may be remotely changed on display 412 via wireless communication. A hybrid identifier would provide direction to dynamically managed information, such as a hyperlink or web address. For example, the unique identifier 847 may be a weblink that has information about a bicycle and it may be remotely changed to information about a lawnmower at an alternate time. The label 846 also includes general instructions 848 which describe how the item contained by the primary means of attachment 820 may be accessed. The label 846 may be attached to any point or object in the locking configuration 800, including objects at or related to the location.

Figure 9:
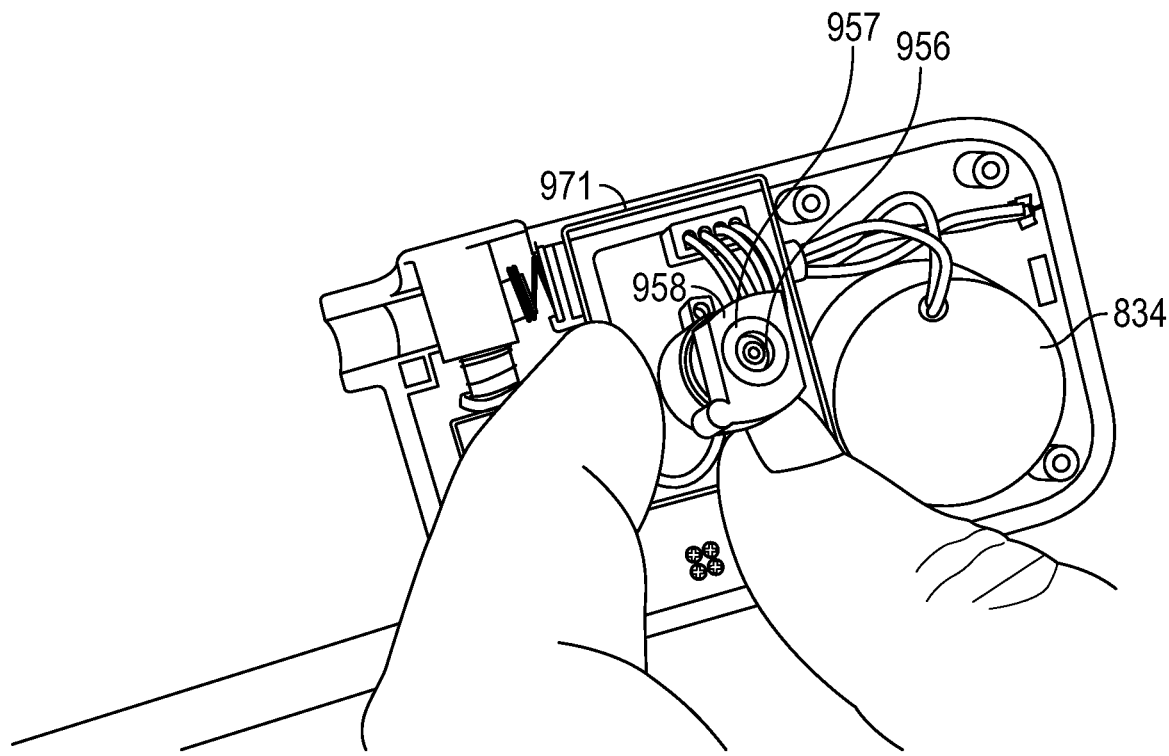
FIG. 9 illustrates a motor assembly.
Figure 10:
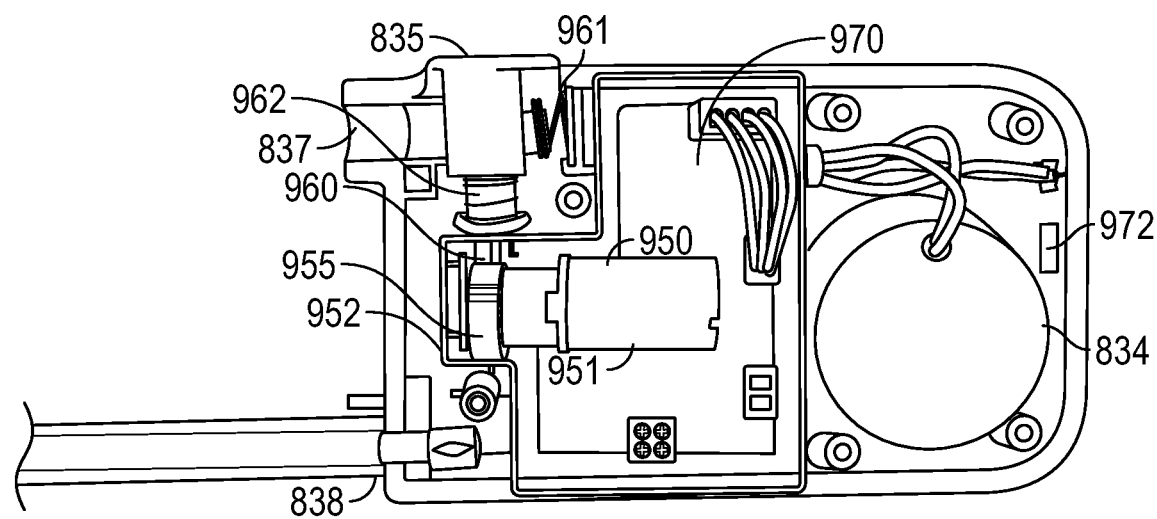
FIG. 10 illustrates a motor assembly.

Now referring to FIGS. 9 and 10. The motor assembly 950 includes the motor 951, speed reducer 952, and cam assembly 955. Speed reduction can be performed by gears, belts, or any other suitable means or combination thereof. The cam assembly 955 includes an output shaft 956, which provides reduced speed output from speed reducer 952 and transmits the reduced speed output to the cam assembly 955 via interface ring 957. The motor 951 is rotated in one or more directions such that a cam 958 is positioned to block or allow movement of latch 835. When movement of the latch 835 is allowed and the latch 835 is depressed by a user, the removable end 845 may be removed from opening 837, thus providing access to items contained by primary means of attachment 820. When movement of the latch 835 is restricted by the cam 958, access is restricted, as the latch 835 securely retains removable end 845 in opening 837. The latch 835 is returned to a non-depressed state by spring 962. When the removable end 845 is positioned within opening 837, a contact 961 is depressed, completing an electrical circuit from the contact 961 to the fixed end 838 via the primary means of attachment 820. Position detector 960 is provided to detect the position of the cam 958. Position detector 960 can be a switch, encoder, magnetic sensor, optical sensor or any other suitable device capable of position sensing. Knowing the position of the cam 958 and continuity status between contact 961 and the fixed end 838, the security status of the lock assembly 810 can be determined by control circuit 970. The cam 958 is carried by interface ring 957 which may be configured to allow the cam 958 to slip. This allows for limited torque and force to be applied to any physical stop provided within the lock assembly 810 and as a result, limits current to the motor 951. As this lock assembly 810 may be used in wet environments, a circuit gasket 971 is provided to prevent the entry of water into the electronics. A housing switch 972 is provided to detect improper access to the system, triggering an alarm from sound emitter 834.

Figure 11:
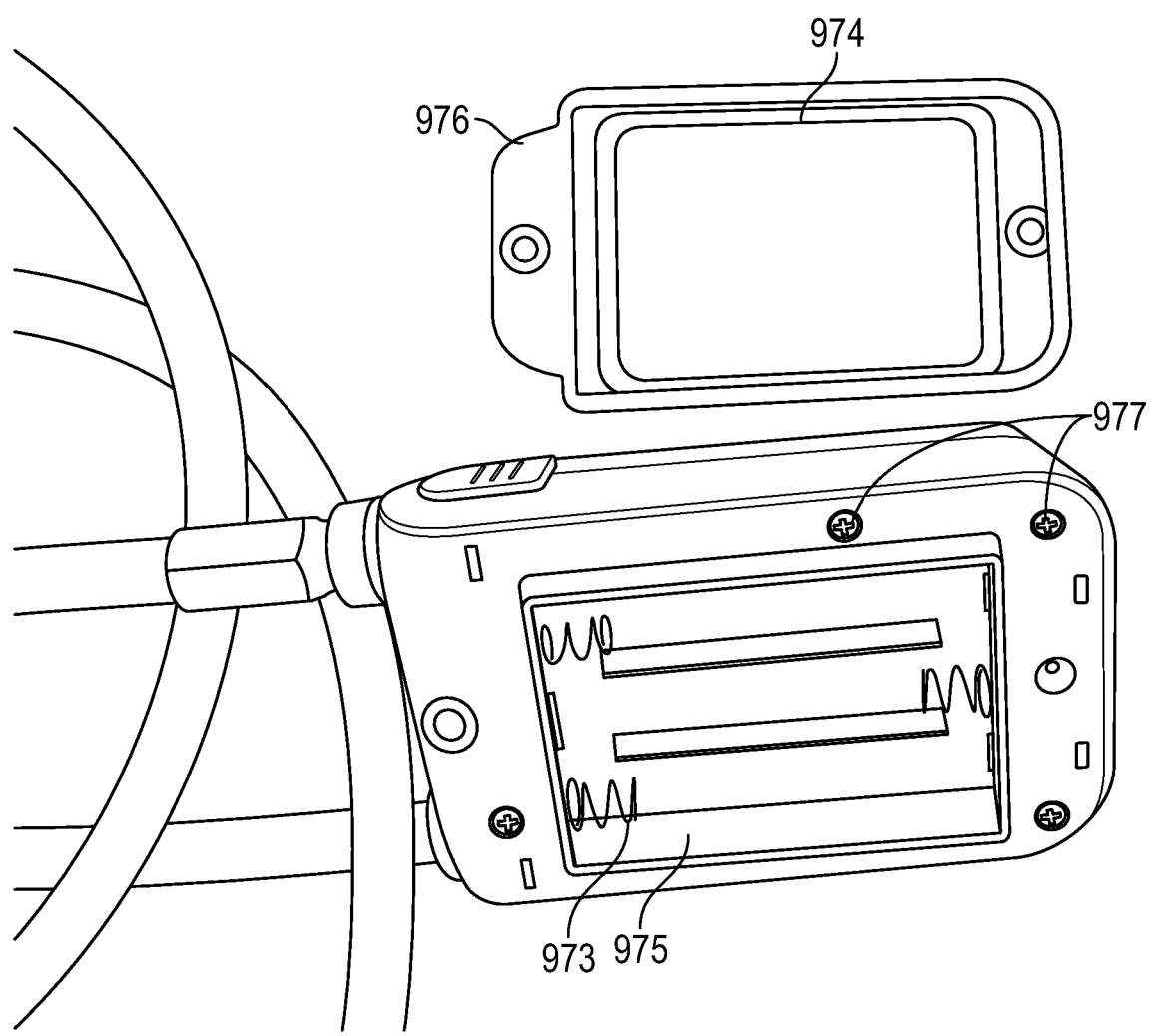
FIG. 11 illustrates a rear housing.

Now referring to FIG. 11, rear housing 975 provides a holder for cells, such as three cells or any other number of cells. The three cells power the system via battery contacts 973 and are enclosed by battery cover 976 and sealed by battery gasket 974. Rear housing 975 is retained by screws 977. One or more of screws 977 may by of the security type, to further prevent tampering.

Figure 12:
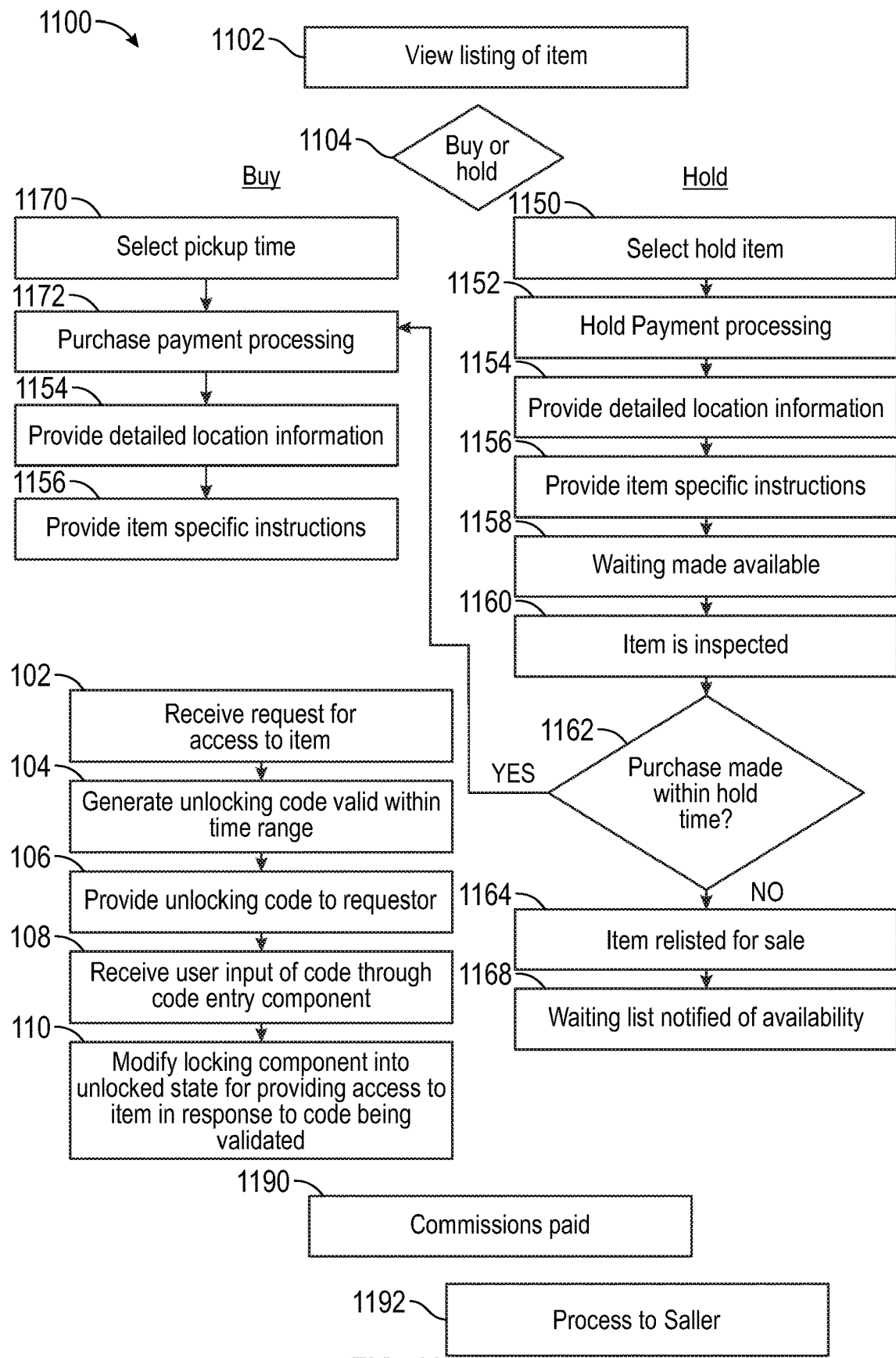
FIG. 12 is a flow diagram illustrating an exemplary method of selectively buying or holding an item using a locking component.

FIG. 12 provides a detailed method for selectively buying or holding an item using a locking component. The method is generally shown as 1100. A user views a listing of an item, at 1102, and decides at decision point 1104 whether to buy the item outright or hold for inspection before purchase. If buy is selected, a pickup time is selected, at 1170, which allows for the purchase to be picked up at a later time. Depending on the time selected, the seller may charge a different fee. At 1172, the purchase payment is processed for the appropriate amount. At 1154, detailed location information is provided. This will include a specific address if the listing of the item did not include this information. It is often preferred that the location is obfuscated to allow potential buyers to know general distance of an item, yet prevent uninvited shoppers at the exact location. At 1156, any other specific instructions for locating, operating, or obtaining the item is provided. This could include where and how the item is attached and located, like on a porch, attached to the rear of a house, or inside a shed, etc. At step 102, a request is received for access to item. At 104, an unlocking code is provided to requestor. At 108, the buyer enters the code through the code entry component. At 110, the locking component is modified to an unlocked state in response to a validated code. At this point, the buyer can remove the item from the locking component. At 1190, commissions would be paid to any of the location provider, lock service, online listing service, affiliates, or other appropriate parties. At 1192, proceeds are paid to the seller. Payments may be delayed by a threshold delay time to account for returns and disputes, and to discourage fraud.

If hold is selected, at 1150, then a hold payment is processed at 1152. Location information of the item is provided, at 1154. Item specific instructions are provided, at 1156. At 1158, the item is designated as waiting made available. At 1160, the item may be inspected, such as by the buyer. At 1162, a decision is made as to whether the item was purchased within a hold time. If not, then the item is relisted for sale, at 1164, and a waiting list of availability is provided, at 1168.

Figure 13:
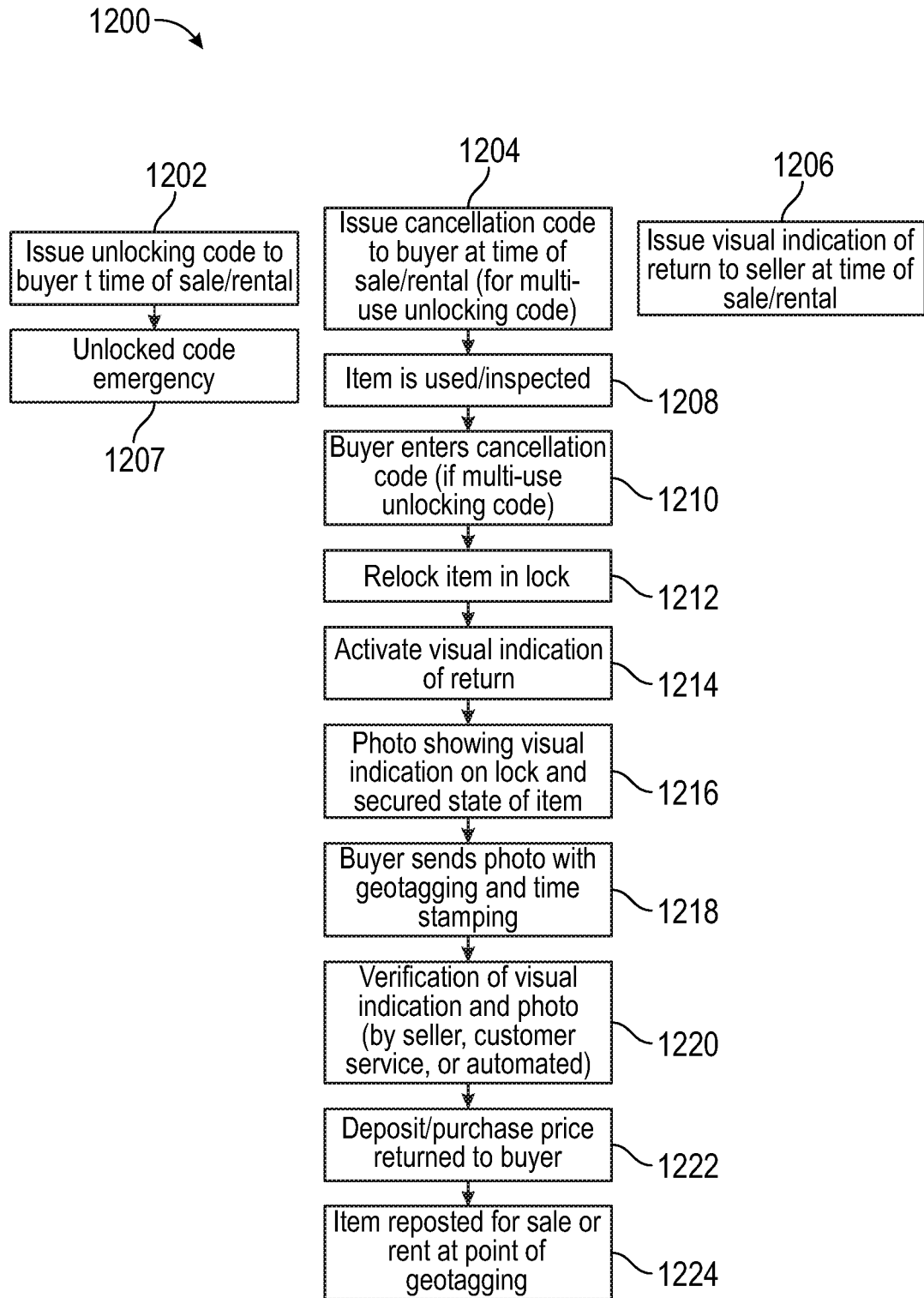
FIG. 13 is a flow diagram illustrating an exemplary method of verifying return of an item that has been resecured by a locking component.

FIG. 13 outlines a method 1200 of verifying return of an item that has been resecured by locking component. When an unlocking code is issued to the buyer, at 1202, a cancellation code can be issued to the buyer, at 1204, if the code issued is a multi-use code. If the code is a one-time use code, there is no need to issue a cancellation code. At 1206, the visual indication of return of the item is sent to the seller. Note that the buyer does not know what the visual indication of return will be. Steps 1202, 1204, and 1206 can occur substantially simultaneously. At 1207, the unlocking code is entered into the lock assembly. At 1208, the item is used/inspected. At 1210, the buyer enters the cancellation code into the lock assembly and, at 1212, relocks the item with the lock assembly. At 1214, the buyer activates the visual indication of the return on the lock assembly so it can be seen. At 1216, the buyer takes a photo showing the secured state of the item and the visual indication of the return. The buyer then sends a geotagged and time stamped photo to the seller, at 1218. The visual indication of return and photo is verified, at 1220. At 1222, any deposit, credit card hold, or purchase price due to the buyer is returned or released. The item can then be reposted for sale or rent at the point of geotagging, at 1224.

Figure 14:
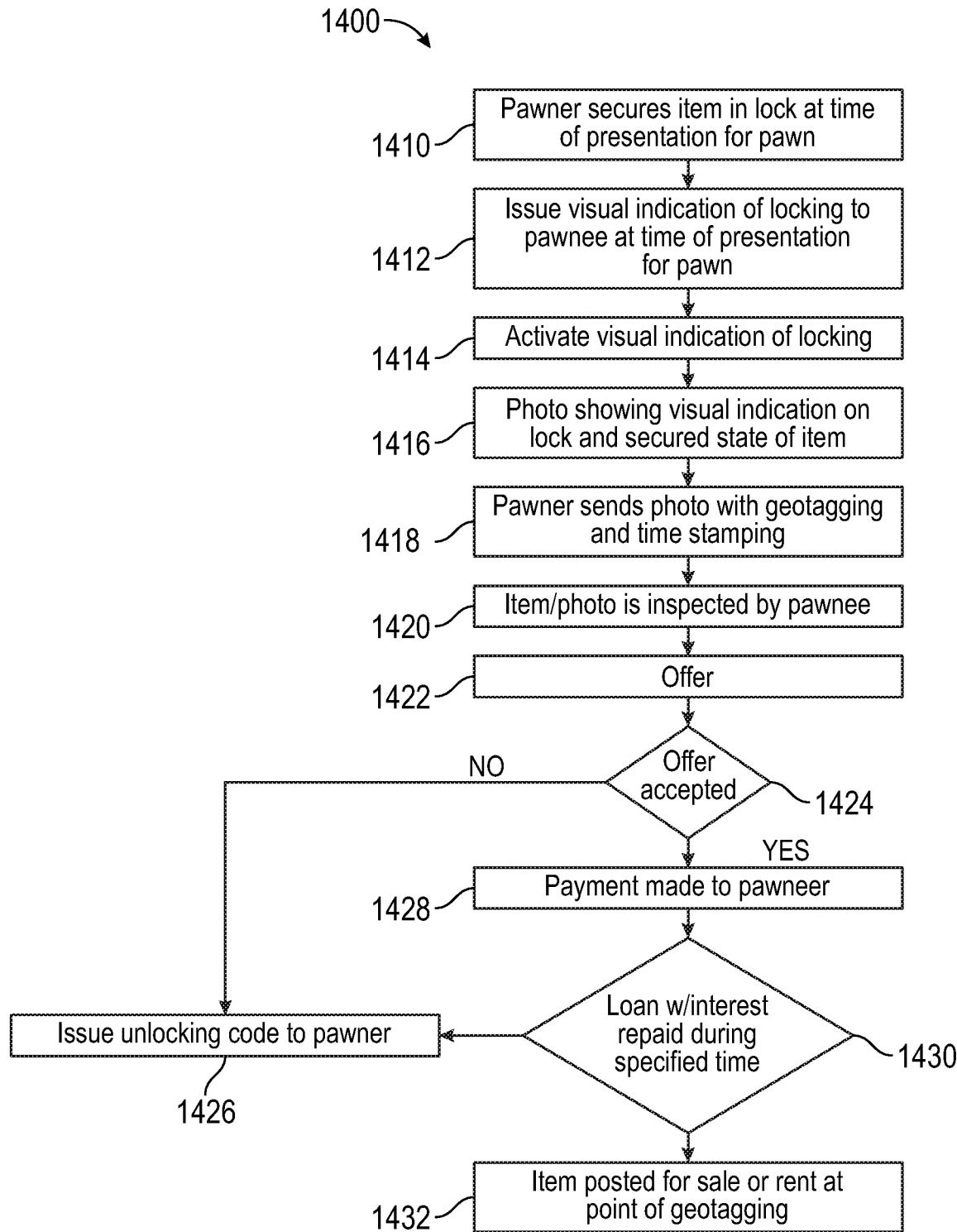
FIG. 14 is a flow diagram illustrating an exemplary method of using a locking component for remote pawn.

FIG. 14 shows a method for using a locking component for remote pawn. At 1410, a pawner secures the item in the locking component for presentation for pawn. At 1412, a visual indication of locking is issued to the pawnee. This can be performed after the last use of the lock in many cases, as there is not a reason to wait until a new event occurs. At 1414, the pawner activates the visual indication of locking. At 1416, the buyer takes a photo showing the secured state of the item and the visual indication of the return. The buyer then sends a geotagged and time stamped photo to the seller, at 1418. At 1420, the photo and/or actual item are inspected by the pawnee. At 1422, the pawnee makes an offer to the pawner. Note that this offer may be for a loan or for purchase of the item. It should also be noted that a zero value offer can also be sent. At decision point 1424, the pawner decides to accept or reject the offer. If the offer is not accepted, then an unlocking code is issued to the pawner, at 1426, such that the item can be removed from the lock. If the offer is accepted a payment is made the pawner, at 1428. At 1430, the loan is either repaid during the specified time or not. In the case of a purchase, the specified time would be zero, so decision point 1430 would be no. If the loan is not repaid on time, the item is posted for sale or rent, at 1432. This posting can happen at the point of geotagging immediately, or the item can be relocated to a more viable location based on the preference of the pawnee. If the loan is timely repaid, at 1430, then an unlocking code is issued to the pawner at 1426.

Figure 15:
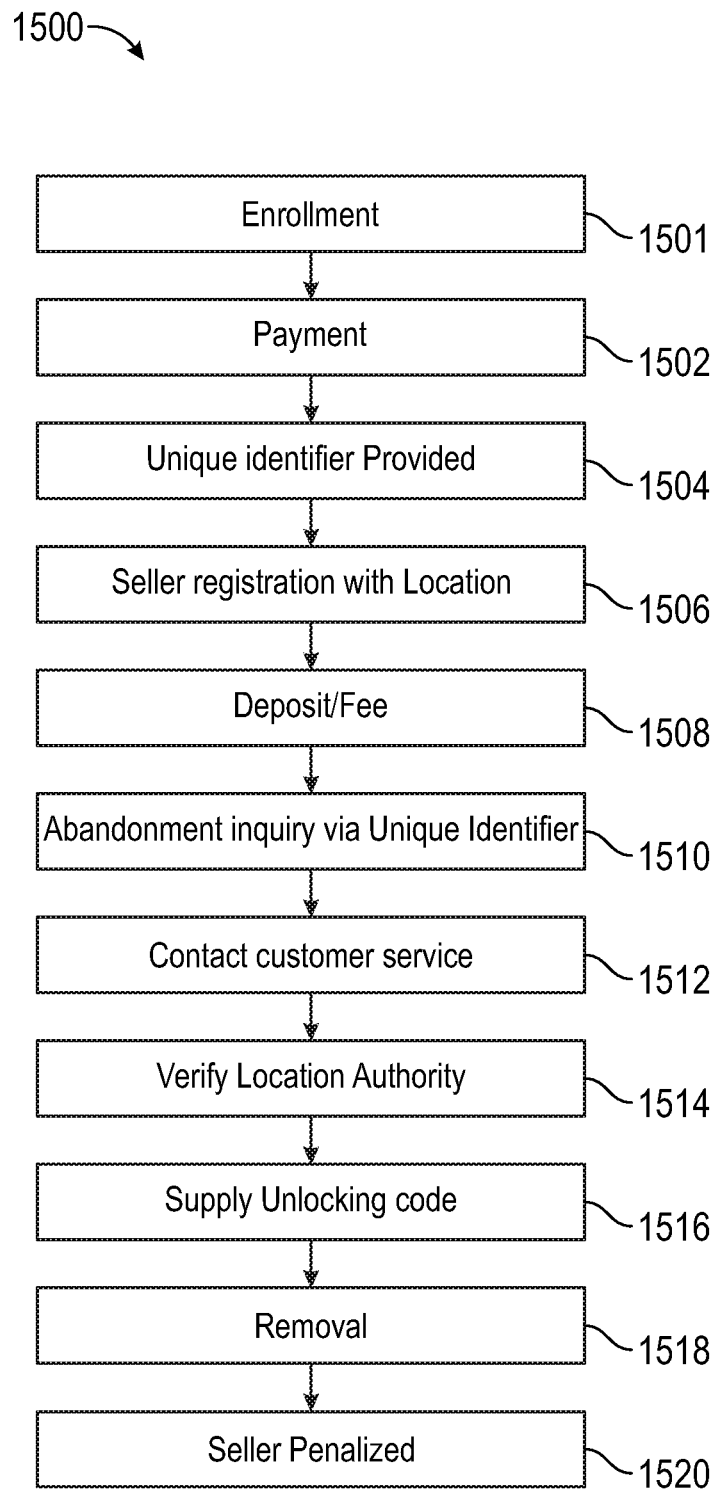
FIG. 15 is a flow diagram illustrating an exemplary method of removal of an abandoned or improperly placed item.

FIG. 15 shows a method 1500 for removal of an abandoned or improperly placed item. At 1501, a seller registers with a lock service. After registering, a payment is made for the service, at 1502. This may be a one-time payment or a recurring payment, and may include a deposit or fee schedule for abandoned or improperly placed items. At 1504, a unique identifier is provided for the lock. At 1506, the seller registers with the location at which the item will be locked. Upon registration with the location, an optional, additional deposit or fee will be paid, at 1508. This may include but is not limited to deposits, licenses, or commissions to the location. At 1510, a third party inquires as to the abandonment status of an item. This may be to see how long the item has been in the location, if it is authorized, etc. This will also allow non-visible items to be identified, which is important to verify that they are not hazardous, illegal, etc. If an initial determination is made or cannot be made, the third party can proceed to contact customer service, at 1512. At 1514, customer service will validate the locational authority of the third party. This can be manual or automatic and may require credentials of the third party. The third party may show ownership of the venue, or other authority, such as that of law enforcement. If authority is verified, at 1514, customer service can supply an unlocking code to the third party, at 1516. At 1518, removal then occurs and can be by the inquiring third party or a removal service. At 1520, the seller is penalized for the abandonment and/or improper use. Penalties may include fine, loss of service fees, suspensions of account, or any viable means of deterring such behavior.

Figure 16A:
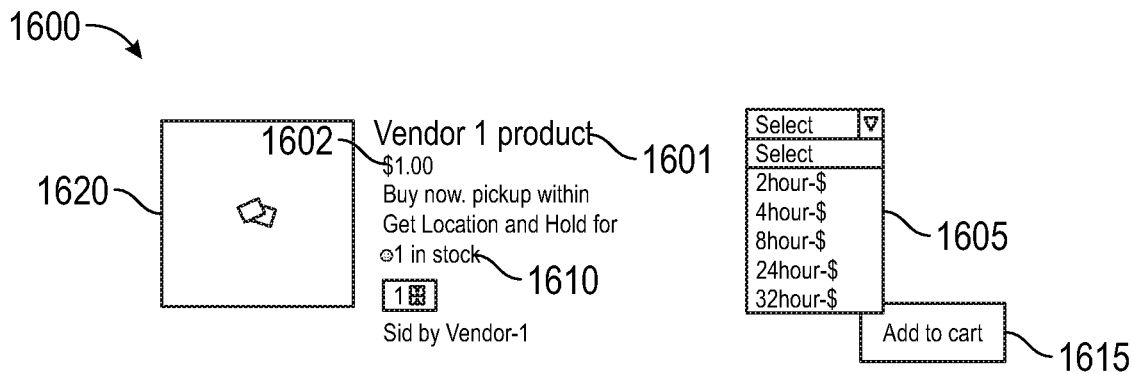
FIG. 16A illustrates a cloud based listing for an item.
Figure 16B:
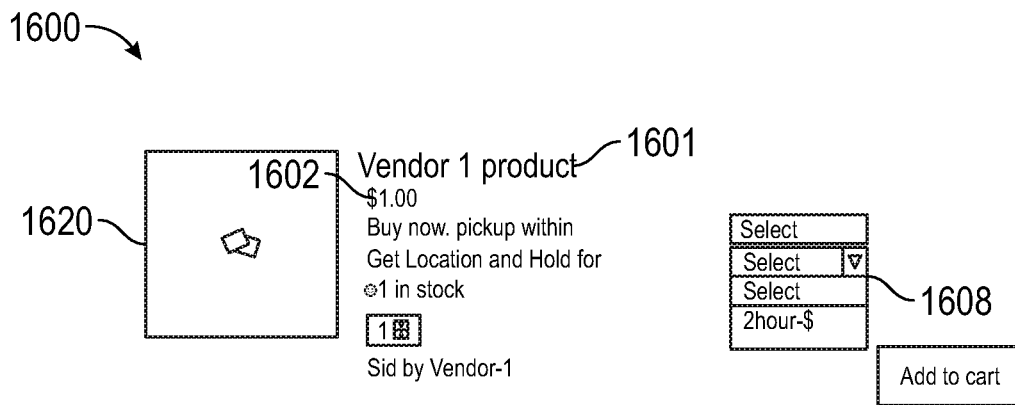
FIG. 16B illustrates a cloud based listing for an item.

FIGS. 16A and 16B show a cloud based listing 1600 for an item associated with a locking assembly, wherein the cloud based listing 1600 is rendered on a display by a computing device. Listing 1600 includes title of the item 1601, general purchase price 1602, an add to cart button 1615, and photo 1620. An in stock status 1610 is also displayed and when out of stock, may act as a link to a waitlist. FIG. 16A illustrates a buy now pickup later pull down box 1605 with pickup times and related fees. Alternately, FIG. 16B illustrates a get location and hold for pull down box 1608.

Figure 17:
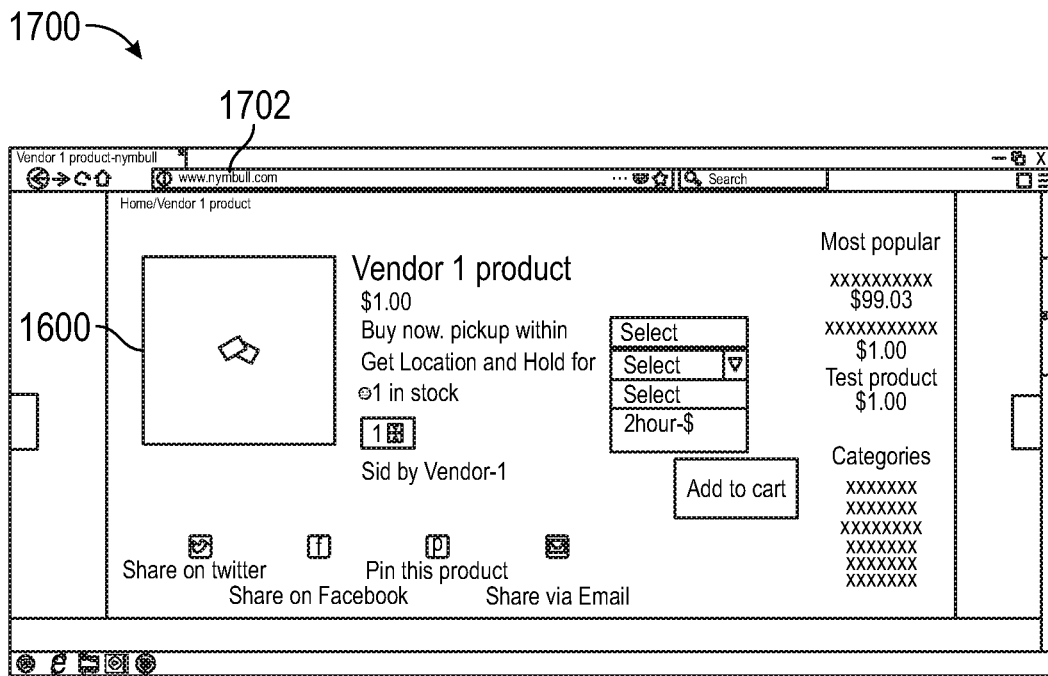
FIG. 17 illustrates a cloud based listing for an item.

FIG. 17 illustrates the cloud based listing 1600 on a browser generally as 1700. The cloud based listing 1660 is assessable by inputting a URL 1702 through the browser, where the URL 1702 acts as the unique identifier.

Figure 18:
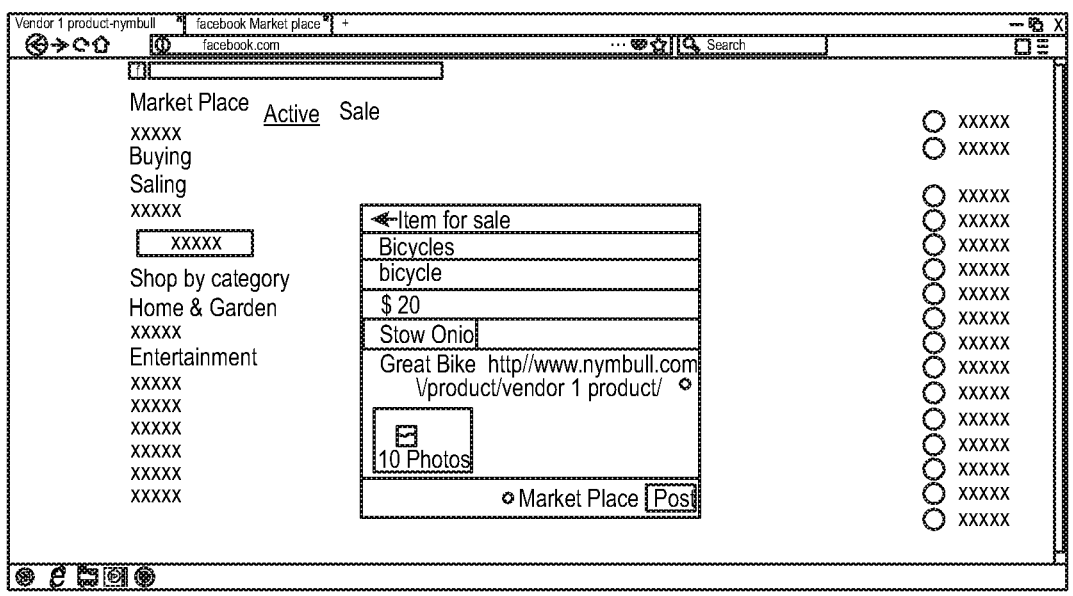
FIG. 18 illustrates a web marketplace listing for an item.
Figure 18:
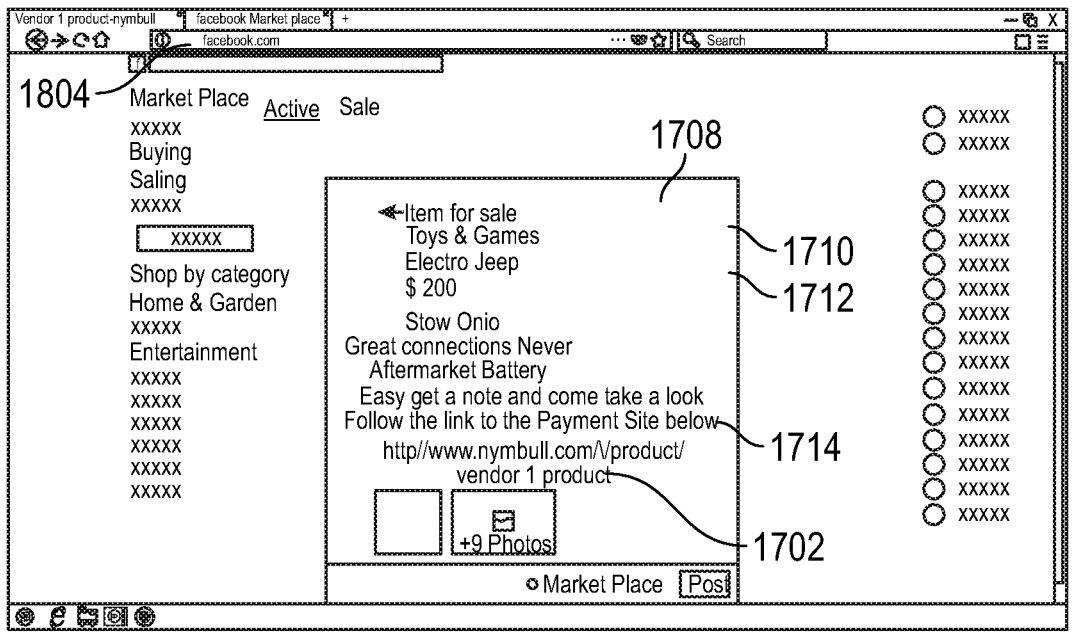

FIG. 18 illustrates an example web marketplace listing 1800 of an item associated with a lock assembly. An address of the marketplace 1804 is rendered through the web marketplace listing 1800. The web marketplace listing 1800 comprises a category 1708, an item header 1710, a marketplace price 1712, a marketplace image 1716, a description 1714, and a URL 1702 that is related to the unique identifier.

Figure 19:
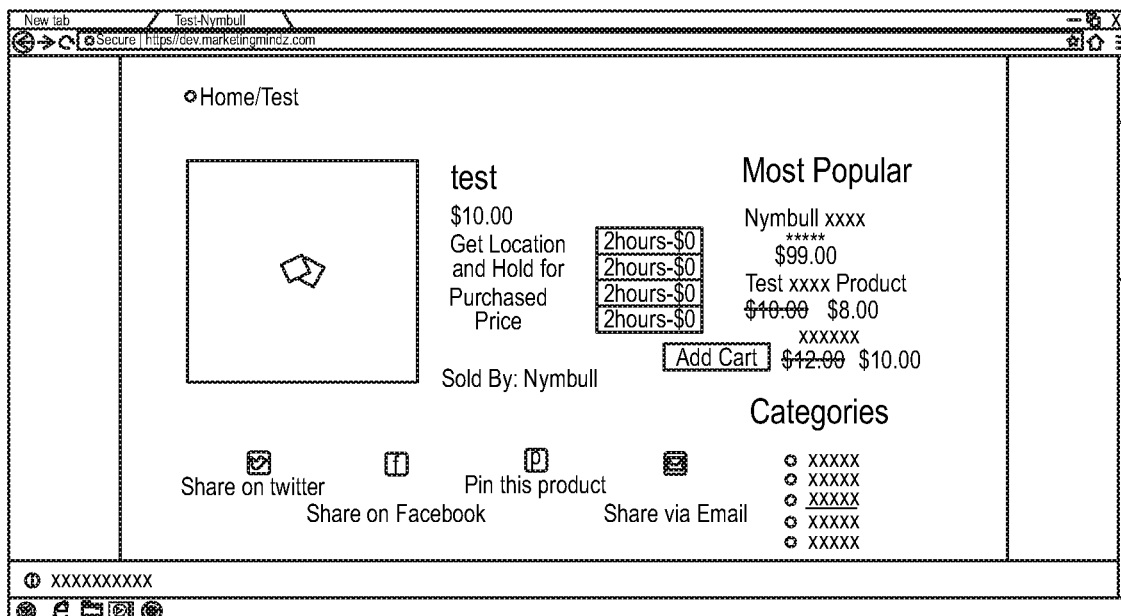
FIG. 19 illustrates a lock service website.
Figure 19:
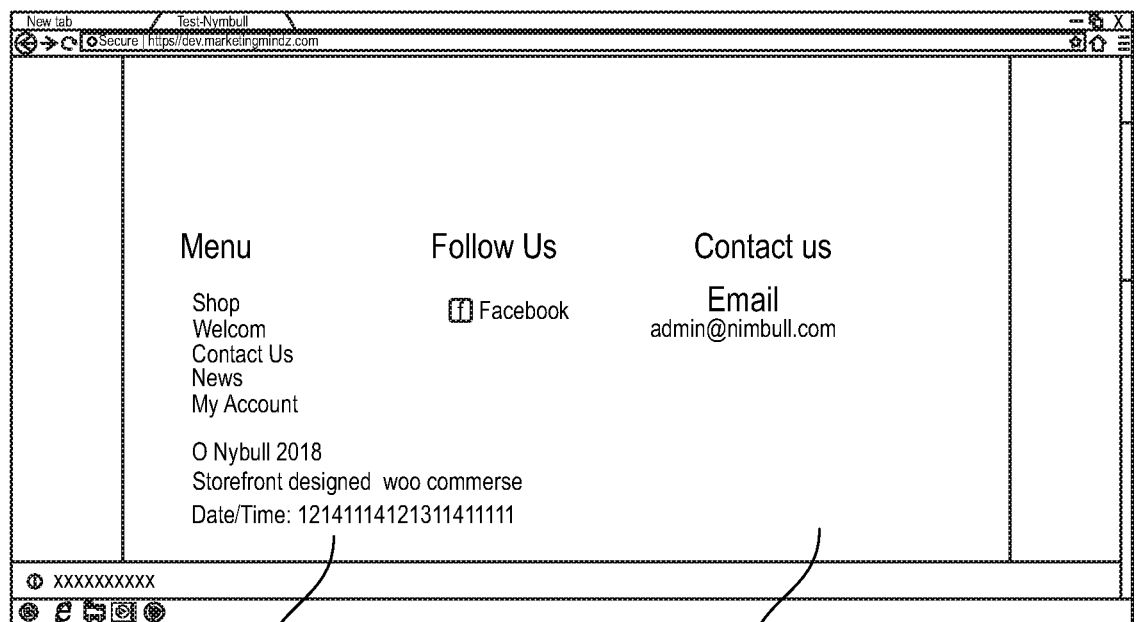

FIG. 19 illustrates a lock service website 1900, which includes a uniquely formatted date/time 1902 used to facilitate clock setting and maintenance of a lock assembly associated with an item.

Figure 20:
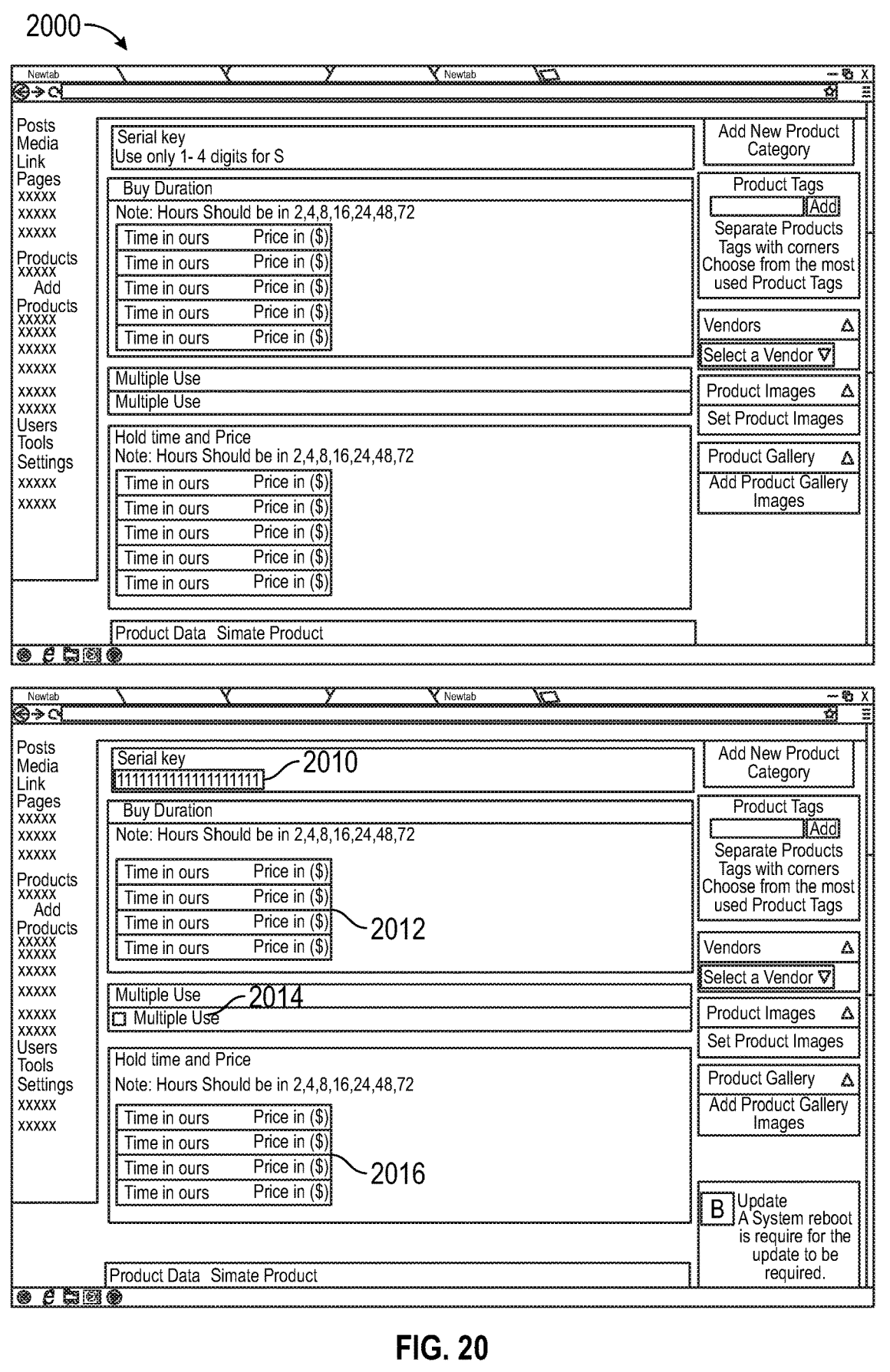

FIG. 20 illustrates an administrative view of a lock service website 2000. The administrative view can be used to set a serial number 2010 for an item, fees for a buy duration 2012, fees for a hold duration 2014, a hold time and price 2106, and can be used to specify whether an unlocking code can be used multiple times. Depending on the type of account access, administrative access may be limited.

Figure 21:
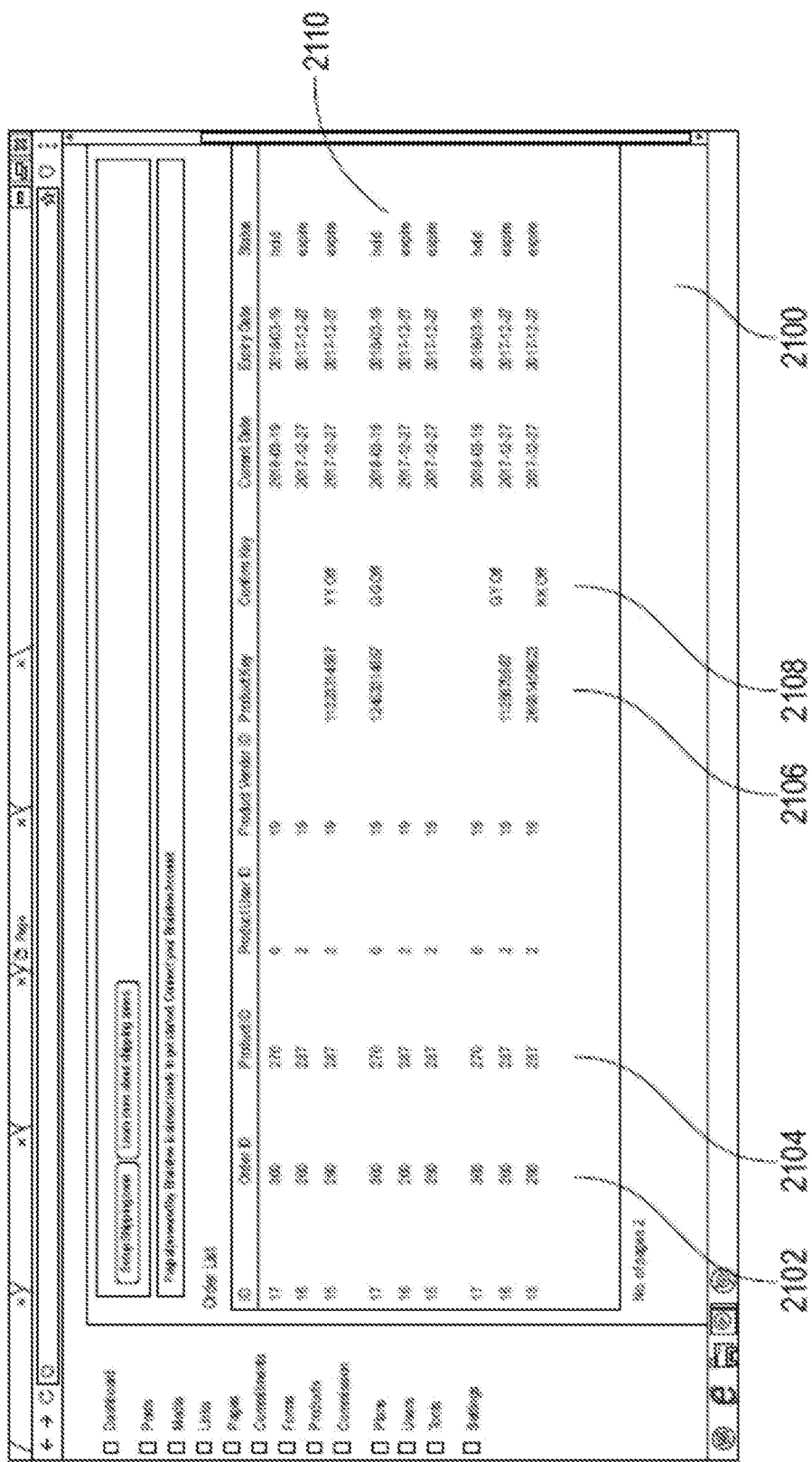
FIG. 21 illustrates a lock service website.

FIG. 21 illustrates an administrative view of a lock service website 2100. In one embodiment, the administrative view displays, for each order, an order number 2102, a product id 2104, a product key 2106, a confirm key 2108, status 2110, and an expiration time. The product key 2106 is used as the unlocking code and the confirm key 2108 is used as to confirm relocking of the locking assembly. In this example, the colors of LEDs are used for the confirm key.

In some embodiments, a method for facilitating a transactional exchange is provided. The method comprises receiving a request, from a requestor, to hold an item secured within a containment component by a locking component for a hold duration. The method comprises selectively restricting, by the locking component, access to the item until either the hold duration has expired or the requestor has purchased the item. In an example, the method comprises restricting, by the locking component, a seller of the item from accessing the item for the hold duration. In an example, the method comprises restricting, by the locking component, an alternate purchaser of the item from accessing the item for the hold duration. In an example, the method comprises maintaining the locking component in a locked state until either the hold duration has expired or the requestor has purchased the item. In an example, the method comprises charging a fee to the requestor for restricting access to the item for the hold duration. In an example, the method comprises selecting the hold duration from a set of values. In an example, the set of values comprise a fee based value and a non-fee based value. In an example, the fee comprises a first portion paid to a first entity and a second portion paid to a second entity. In an example, the method comprises providing item specific instructions to the requestor. In an example, the method comprises generating and providing access to a waiting list for the item. In an example, the method comprises transmitting a notification to entities within the waiting list that the item is available based upon the hold duration expiring.

In some embodiments, a method for facilitating a transactional exchange is provided. The method comprises receiving a request for access to an item secured within a containment component by a locking component. The method comprises generating an unlocking code that is valid within a time range and is valid for either a single use or a plurality of uses. The method comprises providing the unlocking code. The method comprises receiving input of a code through a code entry component associated with the containment component. The method comprises modifying the locking component into an unlocked state for providing access to the item in response to the code being validated off-line as corresponding to the unlocking code and being used within the time range. In an example, the lock component comprises a primary means of attachment and a secondary means of attachment, the secondary means of attachment keeping the locking component secured to a fixed attachment point when access is provided to the item. In an example, the method comprises processing a hold request, received before the request for access is received, to hold the item for a hold duration. In an example, the method comprises selectively restricting, by the locking component, access to the item until either the hold duration has expired or the requestor has purchased the item.

In some embodiments, a method for facilitating a transactional exchange is provided. The method comprises receiving a request for access to an item secured within a containment component by a locking component. The method comprises selecting a pick-up time. The method comprises generating an unlocking code that is valid for either a single use or a plurality of uses. The method comprises providing the unlocking code. The method comprises receiving input of a code through a code entry component associated with the containment component. The method comprises modifying the locking component into an unlocked state for providing access to the item in response to the code being validated as corresponding to the unlocking code. In an example, the method comprises providing item specific instructions relating to the item. In an example, the method comprises providing location information relating to a location of the item. In an example, the method comprises providing a notification that the item is available. In an example, the location information comprises a route populated within a map.

Figure 22:
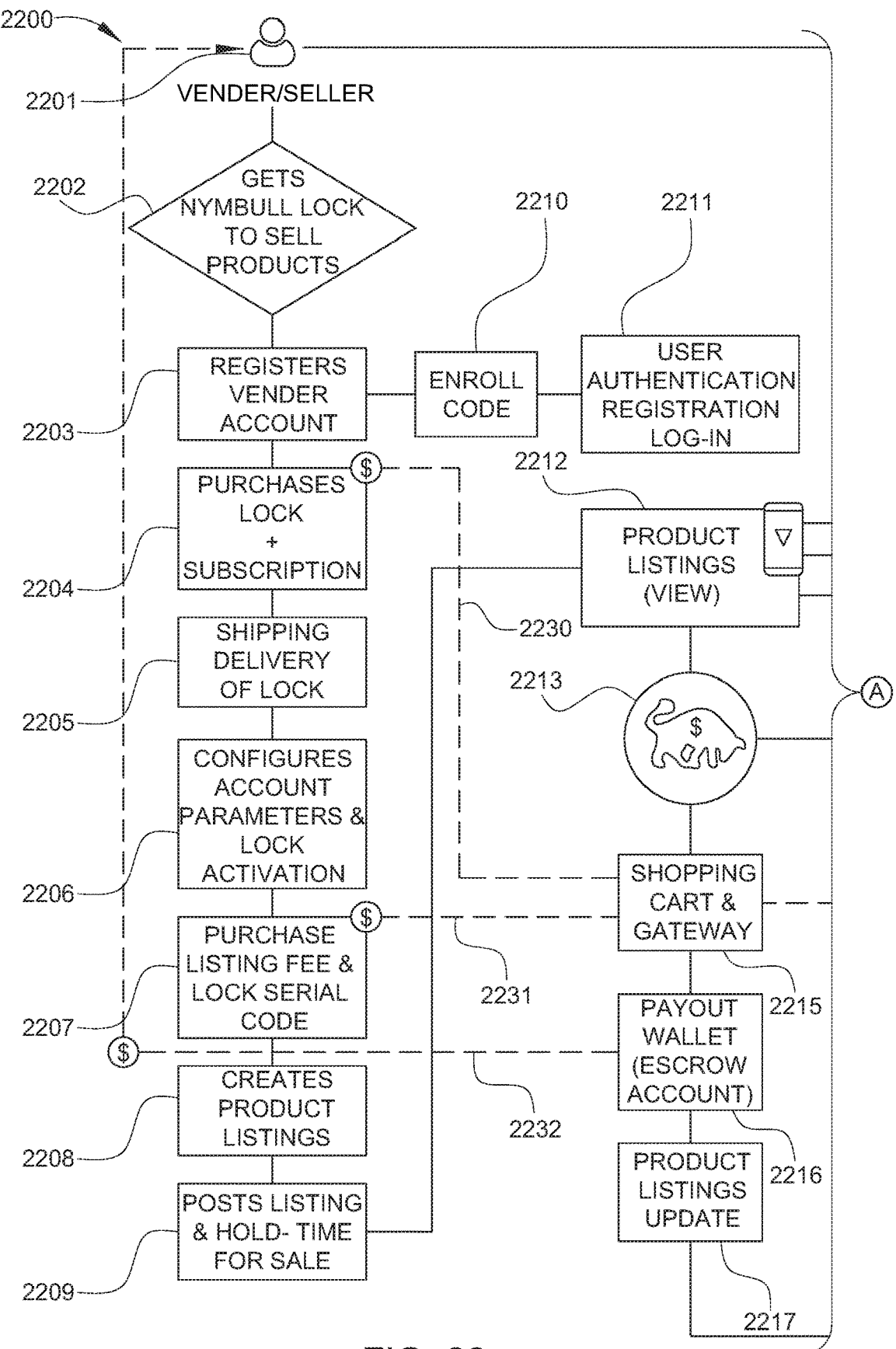
FIG. 22 is a flow diagram illustrating an exemplary method of facilitating exchange of an item.

FIG. 22 illustrates a method 2200 of sellers and buyers transacting over a network. A seller 2201 may make a determination 2202 to acquire an apparatus (e.g., a locking component associated with a containment component within which an item can be secured by the locking component from being accessed or removed) for facilitating exchange/purchase/rental of items (e.g., a bike, pizza, a videogame, a tool, an object, etc.). The seller 2201 generates a vendor account by registering 2203 with a service that manages the apparatus. For example, an enrollment code 2210 may be used, along with user authentication 2211, to register and/or access the vendor account. The seller 2201 may purchase and/or associate 2204 the apparatus (the locking component) with a subscription through the vendor account for selling items using the apparatus. This may be performed 2230 through a shopping cart and gateway 2215 and monetary transaction functionality 2213 provided by the service. In an example, the service may correspond to a web service or a standalone API configured to support a remote locking component or containment component.

The seller 2201 may receive 2205 shipment of the apparatus. The seller 2201 may configure 2206 account parameters of the subscription in order to activate the apparatus for selling a particular item. The seller 2201 may purchase 2207, through the shopping cart and gateway 2215 and monetary transaction functionality 2213 provided by the service, a serial code to use with the apparatus by paying a listing fee 2231. The seller 2201 creates 2208 a product listing to list the item for sale through a product listing interface 2212 (e.g., hosted by the service or separately hosted by the seller 2201). The product listing interface 2212 may be accessible to users through an application, a website, or other medium. The seller 2201 may post 2209 the listing of the item for sale and an ability for buyers to purchase a hold on the item for a hold duration through the product listing interface 2212. The listing may be posted 2209 through various websites, such as in response to a single post request from the seller 2201 (e.g., the post request may specify the websites through which the listing is to be posted).

The service may host an account 2216, such as an escrow account, through which payment 2232 from buyers purchasing items are provided to the seller 2201. When items are purchased and thus become unavailable, the service updates 2217 the product listing of items for sale through the product listing interface 2212. In an example, a seller may need to obtain an unlocking code, used by a code validation component of the containment component, if the item for sale is not purchased. Access to the unlocking code may be restricted until the item is delisted (e.g., as part of an update 2217 to the product listing). The seller is restricted from delisting the item if there is a hold on the item. After purchase, the item would be automatically delisted. In an example, unlocking codes may be generated by the service (e.g., a cloud service), which are then transmitted to another provider (e.g., a website, a cloud environment hosting a market place for buying/renting items, through a payment service, etc.).

A buyer 2220 may interact 2221 with the product listing interface 2212, such as by using a mobile device to interact with the service and/or the apparatus. In an example, the buyer 2220 may determine to purchase 2226 access to the product through the product listing interface 2212. Upon submitting payment, an unlocking code may be provided 2227, such as by being sent to the mobile device of the buyer 2220. The buyer 2220 may utilize 2228 the unlocking code to unlock the locking component of the apparatus in order to gain access to the item, thus completing 2229 the buyer 2220 and seller 2201 interaction. If any issues arise, the buyer 2220 can create a support ticket 2214 with the service in order to resolve such issues with the seller 2201.

In another example, instead of directly purchasing access to the item right away, the buyer 2220 may submit a request 2222 for the item to be secured by the apparatus for a hold duration. Various hold durations may be available, such as a non-fee based duration (e.g., a shorter duration) or a fee based duration (e.g., a longer duration). For example, a fee may be charged to the buyer 2220 for holding the item. The fee may be split and paid to one or more entities, such as the seller 2201, the service, etc. Access to the item is selectively restricted by the apparatus (e.g., the locking component may be maintained in a locked state so that the item cannot be removed from the containment component) until either the hold duration expires or the buyer 2220 purchases the item. During the hold duration, the seller 2201 and/or other alternative/potential buyers may be restricted from accessing the item. Once the hold duration has expired, any alternative buyers on a waiting list for purchasing access to the item may be notified of the availability to now purchase access to the item. For example, users may access the service to be placed on the waiting list during the hold duration.

During the hold duration, a geolocation of the mobile device of the buyer 2220 may be tracked, such as to determine whether the buyer 2220 is located proximate the item for inspection. During the hold duration, the buyer may purchase 2226 access to the item or allow the hold duration to expire 2225.

Figure 24:
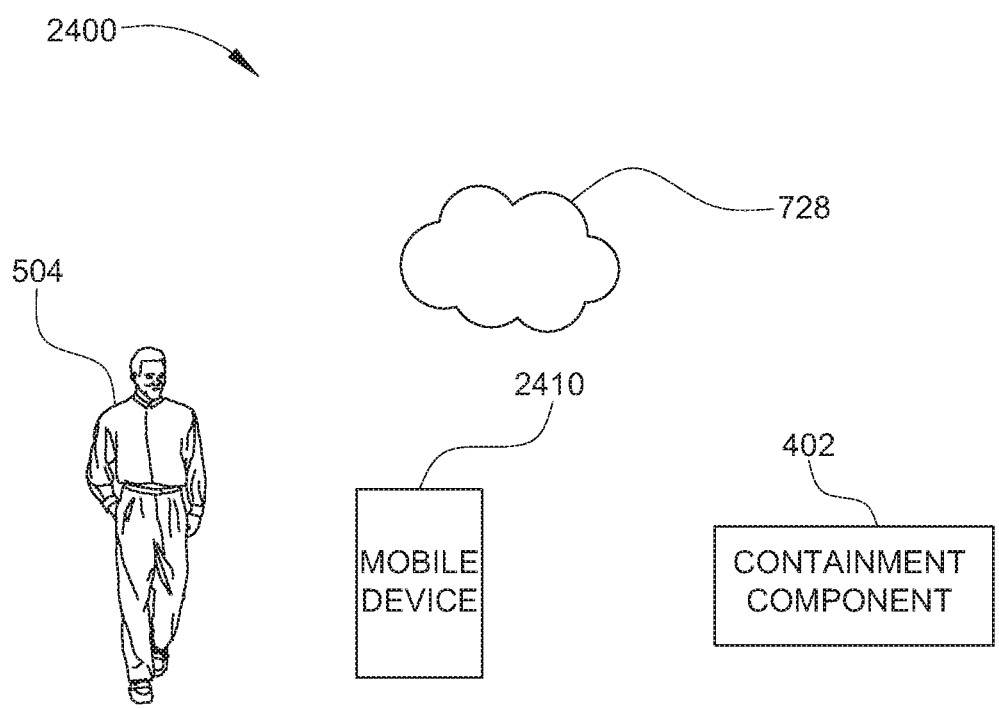
FIG. 24 illustrates a user using a mobile device to interact with a containment component.

FIG. 24 illustrates an example 2400 of a user 504 utilizing a mobile device 2410 to interact with a containment component 402 over a network 728, such as by accessing the containment component 402 through the service that manages the containment component.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for facilitating a transactional exchange comprising:
   receiving a request, from a requestor, to hold an item secured by a containment component by a locking component for a hold duration, wherein the hold corresponds to an exclusive right for the requestor to subsequently purchase access to the item not yet purchased by the requestor; and
   selectively restricting access to the item from parties other than the requestor based upon the hold until the hold duration has expired.

2. The method of claim 1, comprising:
   restricting, by the locking component, a seller or an alternative purchaser of the item from accessing the item for the hold duration.

3. The method of claim 1, comprising:
   restricting access via a product listing interface.

4. The method of claim 1, comprising:
   maintaining the locking component in a locked state until either the hold duration has expired or the requestor has purchased the item.

5. The method of claim 1, comprising:
   charging a fee to the requestor for restricting access to the item for the hold duration.

6. The method of claim 5, wherein the fee comprises a first portion paid to a first entity and a second portion paid to a second entity.

7. The method of claim 1, comprising:
   selecting the hold duration from a set of values.

8. The method of claim 7, wherein the set of values comprises a fee based value and a non-fee based value.

9. The method of claim 1, comprising:
   providing item specific instructions to the requestor.

10. The method of claim 1, comprising:
    generating and providing access to a waiting list for the item.

11. The method of claim 10, comprising:
    transmitting a notification to entities within the waiting list that the item is available based upon the hold duration expiring.

12. A method for facilitating a transactional exchange comprising:
    receiving a request for access to an item secured by a containment component by a locking component that is portable;
    generating an unlocking code that is valid within a time range and is valid for either a single use or a plurality of uses;
    providing the unlocking code;
    receiving input of a code through a code entry component associated with the containment component; and
    modifying the locking component into an unlocked state for providing access to the item in response to the code being internally validated off-line by the locking component as corresponding to the unlocking code and being used within the time range, wherein the locking component determines what is a valid unlocking code in real-time in response to receiving the input of the code.

13. The method of claim 12, wherein the locking component comprises a primary means of attachment and a secondary means of attachment, the secondary means of attachment keeping the locking component secured to a fixed attachment point when access is provided to the item, wherein the secondary means of attachment is selectively removable.

14. The method of claim 12, comprising:
    processing a hold request, received before the request for access is received, to hold the item for a hold duration, wherein the hold corresponds to an exclusive right for the requestor to subsequently purchase access to the item not yet purchased by the requestor.

15. The method of claim 14, comprising:
    selectively restricting, by the locking component, access to the item based upon the hold until either the hold duration has expired or the requestor has purchased the item.

16. An apparatus comprising:
    a containment component configured to receive an item corresponding to a medication;
    a locking component configured to selectively lock or unlock the containment component for restricting or providing access to the item;
    a code generation component configured to
        receive a request, from a requestor, for access to the item secured within the containment component by the locking component;
        generate an unlocking code that is valid within a time range and is valid for either a single use or a plurality of uses; and
        provide the unlocking code to a requestor; and
    a code entry component configured to:
        receive a user input of a code;
        modify the locking component into an unlocked state for providing the requestor with access to the item in response to the code being validated as corresponding to the unlocking code and being used within the time range; and
        restrict access to the medication according to a planned interval of access and verification of proper consumption.

17. The apparatus of claim 16, comprising:
    an alarm component configured to generate an alert based upon unauthorized attempts to access the item.

18. The apparatus of claim 16, wherein the code entry component is configured to:
    in response to providing access to the medication, displaying imagery to indicate that a specific unlocking code has been used.

19. The apparatus of claim 16, wherein the code entry component is configured to:
    receive a second user input of a second code; and
    provide access to a sample of the item in response to the second code being validated as corresponding to a sample access code.

20. The apparatus of claim 16, the locking component configured to:

receive and implement an instruction from a third party to lock the containment component for restricting access to the item for a time duration.

* * * * *